(12) United States Patent
Harrold et al.

(10) Patent No.: US 6,703,989 B1
(45) Date of Patent: Mar. 9, 2004

(54) STEREOSCOPIC DISPLAY

(75) Inventors: Jonathan Harrold, Oxford (GB); David Ezra, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 204 days.

(21) Appl. No.: 09/610,297

(22) Filed: Jul. 5, 2000

(30) Foreign Application Priority Data

Jul. 7, 1999 (GB) .............................................. 9915781

(51) Int. Cl.$^7$ ................................................. G09G 3/00
(52) U.S. Cl. ............................... 345/32; 345/6; 348/54; 348/58; 359/493; 349/117
(58) Field of Search ...................... 345/4, 6–9, 32, 345/88; 359/462–477; 348/42–60; 349/117, 129

(56) References Cited

U.S. PATENT DOCUMENTS

| | | | |
|---|---|---|---|
| 5,317,393 A | | 5/1994 | Lee ................................ 348/58 |
| 5,528,420 A | * | 6/1996 | Momochi .................... 359/463 |
| 5,956,001 A | | 9/1999 | Sumida et al. |
| 6,046,787 A | | 4/2000 | Nishiguchi |
| 6,055,103 A | * | 4/2000 | Woodgate et al. .......... 359/494 |
| 6,128,059 A | * | 10/2000 | Nishiguchi ................... 349/129 |
| 6,151,062 A | * | 11/2000 | Inoguchi et al. .............. 348/51 |
| 6,160,527 A | * | 12/2000 | Morishima et al. ............ 345/7 |

FOREIGN PATENT DOCUMENTS

| | | |
|---|---|---|
| DE | 32 03 339 A1 | 8/1983 |
| EP | 9-304740 | 11/1997 |
| EP | 10-253824 | 9/1998 |
| EP | 10-268233 | 10/1998 |
| GB | 2 321 815 A | 5/1998 |
| JP | 9-211387 * | 8/1997 |

OTHER PUBLICATIONS

European Search Report regarding Application No. 00305693.4 dated Dec. 4, 2002.

* cited by examiner

Primary Examiner—Amr Awad
(74) Attorney, Agent, or Firm—Renner, Otto, Boisselle & Sklar, LLP

(57) ABSTRACT

A stereoscopic display comprises a spatial light modulator such as a liquid cryatal device. The modulator comprises an array of pixels such as RGB pixels. A retarder array is disposed on the front of the spatial light modulator. The array comprises first stripes and second stripes which extend vertically and alternate which each other horizontally. The first and second stripes supply light from the modulator to an observer with different, preferably orthogonal, polarizations. Each of the stripes has a width which is greater than the horizontal pitch of the pixels. In a preferred embodiment, a lenticular screen is disposed in front of the retarder array. The lenticules extend vertically and are spaced horizontally with a pitch which is substantially equal to the pitch of the pixels.

36 Claims, 25 Drawing Sheets

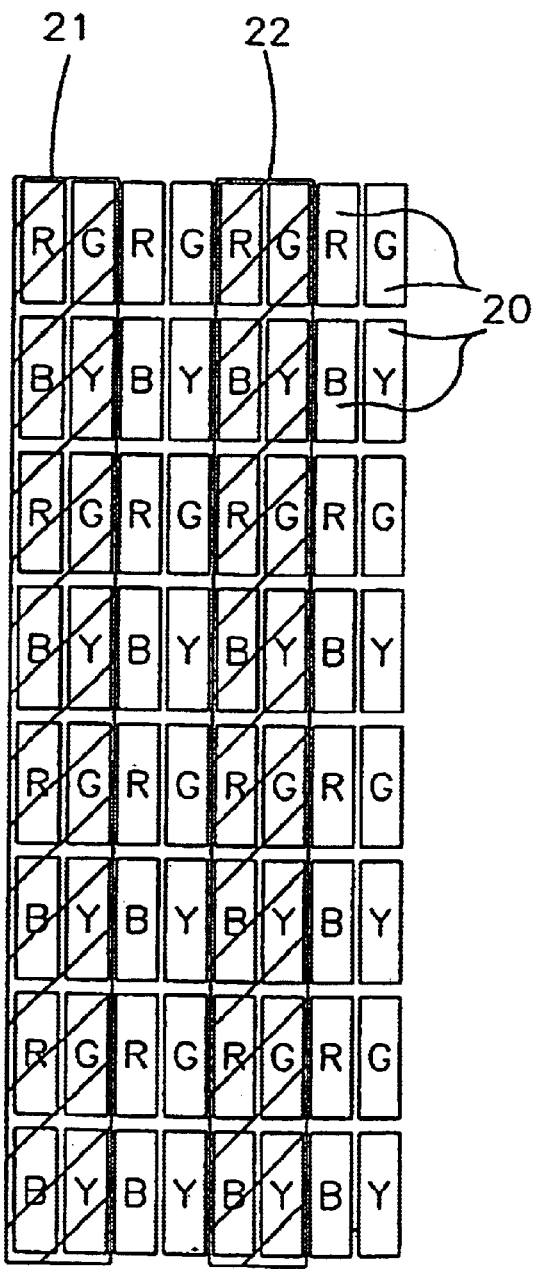
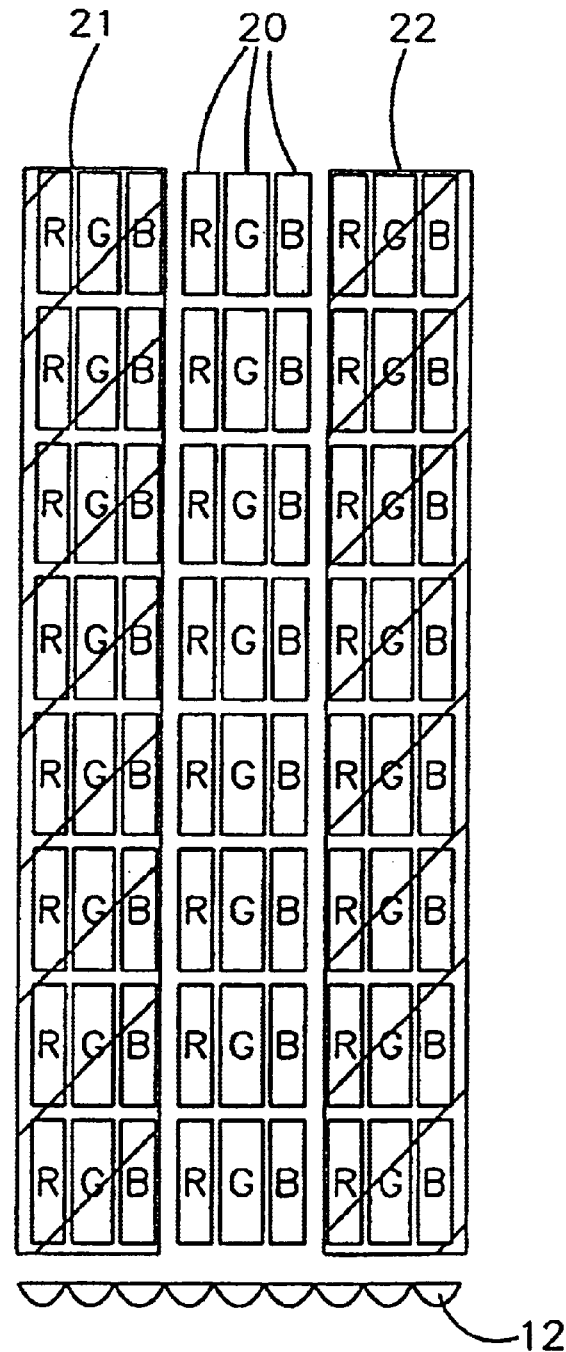
FIG 12
FIG 13

This shows that a point source will be imaged to a line on the reflector. Such a line will be quite a small spot because the performance of the lenticular sheet is good in order to produce a good window image.
The light will then be scattered or diffused from the diffusing reflector.
This will illuminate part of the window with a very bright image.

STEREOSCOPIC DISPLAY

BACKGROUND OF THE INVENTION

1. Field of the Invention

The present invention relates to a stereoscopic display. Such a display may be used, for example, as a reflective display and in hand-held devices such as small dedicated game computers.

2. Description of the Related Art

A known type of stereoscopic display is disclosed in U.S. Pat. No. 5,537,144. The display is of the spatially multiplexed micropolariser type. Two complementary checkerboard masks are used to select complementary checkerboard patterns of picture elements (pixels) of the two two dimensional (2D) images to be displayed. The selected pixels from the two images are interlaced to form a composite spatially multiplexed image. A micropolariser is then disposed over the composite image so that light from the left view pixels is polarised with a first polarisation and light from the right view pixels is polarised with a second polarisation orthogonal to the first polarisation. An observer wears viewing spectacles comprising orthogonally oriented polarisers so that the left eye can see only the left view pixels whereas the right eye can see only the right view pixels.

Although U.S. Pat. No. 6,5537,144 discloses in detail the checkerboard patterns with right and left view pixels alternating with each other horizontally and vertically in the composite image, there is a suggestion that other patterns are possible. In particular, there is brief reference to a one dimensional array of polariser stripes but no other information is given concerning such an arrangement. Also, the use of a patterned retarder with a uniform polariser to form the micropolariser ie described. In such an arrangement, light from the composite image is first polarised by the uniform polariser. A suitable pattern of retarders is then formed so as to rotate the polarisation of light from either the left or the right pixels so as to maintain the orthogonal polarization.

U.S. Pat. No. 5,537,144 is not concerned with the effects of parallax resulting from the spacing between the micropolariser and the composite image. Similarly, there is no mention or consideration of viewing angle performance.

A known type of stereoscopic display based on the teachings of U.S. Pat. No. 5,537,144 is known as "CyberBook" and is available from VREX Inc., a division of Reveco Inc. FIG. 1 of the accompanying drawings illustrates this type of display, which comprises a spatial light modulator (SLM) 1 in the form of a liquid crystal device (LCD). The SLM 1 comprises front and rear transparent substrates 2 and 3 defining a cell containing a liquid crystal layer 4. The display also comprises a back light (not shown) for directing light through the SLM 1 towards a viewing region 5.

The SLM 1 comprises a rectangular array of pixels, one of which is indicated diagrammatically at 6. The front substrate carries on its external surface a linear polariser 7 and an array of horizontal retarder stripes such as 8. The polariser 7 and the array of retarder stripes 8 form a micropolariser. In particular, light from the SLM 1 passing through the polariser 7 emerges with a first linear polarisation. The vertical width of the stripes 8 may be slightly less than the vertical pitch of the pixels 6 so as to ensure that an observer located in the viewing region 5 can see every row of pixels 6 of the SLM 1 through the correct retarder stripe 8 or a gap between adjacent retarder stripes. This is generally referred to as "viewpoint correction".

Light passing from rows of pixels 6 aligned with gaps between the stripes 8 of the retarder propagated to the viewing region 5 with the linear polarization determined by the polariser 7. Light from the rows of pixel 6 passing through the aligned stripes 8 of the retarder have their linear polarisation rotated through 90°. An observer indicated diagrammatically at 9 wears viewing spectacles with polarisers 10 and 11 which are oriented so that, for example, the polariser 10 passes light whose polarisation has been rotated by the retarder stripes 8 and attenuates light received directly from the polariser 7 whereas the polariser 11 passes light received directly from the polariser 7 but attenuates light received from the retarder stripes 8. If the polarisers 10 and 11 are worn over the left and right eyes respectively, of the observer 9, and if the rows of pixels aligned with the retarder stripes 8 display left view image data whereas the rows of pixels aligned with the gaps between the retarder stripes 8 display right view image data, the observer 9 perceives a stereoscopic three dimensional (3D) image.

Because the retarder stripes 8 extend horizontally, the observer 9 has considerable freedom of movement in a horizontal direction relative to the display and no undesirable visual artefacts will occur because of parallax between the stripes and the pixel apertures which are separated by the thickness of the substrate 2 and the polariser 7. However, the vertical freedom of movement is far more limited. In a typical example of a display of this type, the front substrate 2 is approximately 1.1 millimeters thick whereas the vertical pitch of the pixels 6 is typically about 300 micrometers. Correct performance of the display relies on the observer seeing the rows of pixels 6 through the respectively aligned retarder stripes 8 or gaps therebetween. Vertical movement of the observer 9 relative to the display out of the intended viewing region 5 immediately results in undesirable visual artefacts. In particular, as the line-of-sight alignment of the pixel rows and the retarder stripes 8 or gaps therebetween becomes lost, dimming artefacts and then crosstalk between the left and right images become visible. Further vertical movement results in the pixel rows displaying the left and right view image data being seen by the right and left eyes, respectively, of the observer 9 i.e. pseudoscopic viewing. Such visual artefacts are most undesirable so that the vertical freedom of movement of the observer 9 for correctly viewing the display is severely limited.

Thus, displays of the type shown in FIG. 1 are of practical use only in applications where the limited vertical viewing freedom is not a problem, for example in desktop displays. Displays of this type are not suitable for reflective displays, where the display is generally tilted according to the prevailing lighting conditions so as to give the best display brightness, and for hand-held displays, such as dedicated games computers which are tilted during the playing process. This is illustrated in FIG. 2 of the accompanying drawings, where an observer 9 tilts a display 1 in a direction indicated by a double-headed arrow 13 so as to obtain a best view of the display. A reflective display is typically illuminated by an overhead source 14 such as the sun, a lamp or a fluorescent tube. Such a bright small source tends to result in specular reflection an shown at 15 and the observer tilts the display so as to maximise display brightness while avoiding the specular reflection as shown at 15. The observer 9 may also obtain a best view on the other side of the specular reflection.

FIG. 3 of the accompanying drawings illustrates another known type of stereoscopic display, for example as disclosed in Japanese patent publication no. 9-304740. The display is of the transmissive type and is similar to that shown in FIG.

1 except that a lenticular screen 12 whose cylindrically converging lenticules are oriented horizontally is disposed in front of the retarder array 8. In FIG. 3, the difference between the vertical pitch of the pixels 6 and the vertical pitch of the retarder stripe 8 is exaggerated to illustrate the viewpoint correction. The vertical pitch of the lenticules of the screen 12 is substantially equal to that of the retarder array 8 but, depending on the spacing between the lenticules 12 and the retarder stripes 8, is slightly less so as to match the viewpoint correction.

The provision of the lenticular screen 12 substantially increases the vertical size of the viewing zone 5 and thus increases the vertical freedom of movement of an observer. However, the lenticular screen 12 must be manufactured to high tolerance for a high resolution display and must be accurately aligned with the retarder stripes 8 end the rows of pixels 6 in order to function correctly and avoid undesirable visual artefacts.

Whereas the display shown in FIG. 1 may be used to display 2D images at full resolution and with large viewing freedom merely by the observer 9 removing the viewing spectacles, the display of FIG. 3 when viewed without polarising glasses is less effective for 2D viewing. The lenticular screen 12 converts the spatially varying opaque addressing electrodes, pixel and black mask pattern of the SLM 1 to an angular pattern such that black regions between the horizontal rows of pixels 6 are converted into substantial intensity artefacts in the 2D viewing mode. This substantially limits the artefact free vertical freedom of movement of the observer in the 2D mode. This is illustrated in FIG. 4 of the accompanying drawings, which illustrates black regions which are disposed between images of pixels and which represent images of black regions of the SLM 1 such as electrode lines covered by the black mask.

Although the display of FIG. 3 in 3D mode produces a larger orthoscopic viewing region in the vertical direction than that shown in FIG. 1, the pseudoscopic regions are similarly enlarged. Thus, there remains insufficient viewing freedom to operate a hand-held reflective display, which must retain extremely wide vertical viewing freedom in order to operate with the typical ambient overhead illumination.

JP 9-304740 also discloses an arrangement in which the retarder stripes and the lenticular screen are oriented vertically. The retarder stripe width is substantially equal to the pixel pitch. Although this arrangement improves the vertical viewing freedom of the display, the disadvantages associated with this type of lenticular screen remain.

GB 2 321 815 relates to an autostereoscopic display with a viewer position indicator to assist a viewer in positioning himself within the orthoscopic viewing regions so as to avoid the pseudoscopic regions. The display makes use of a spatial light modulator and a parallax optic for generating the parallax for 3D viewing and also for making the positioning indication visible in the appropriate viewing regions. In one set of embodiments, the parallax optic is a parallax barrier and details are given of a specific arrangement which makes use of a stripe-patterned retarder for varying the polarisation of light from the SLM with another polariser for analysing the output light to make the barrier structure visible. Thus, the retarder has relatively narrow slit regions and relatively wide barrier regions.

U.S. Pat. No. 5,317,393 discloses a stereoscopic display for use with crossed polarising glasses worn by an observer. An image display device has alternating columns for displaying left and right image strips with each pixel column lying behind a polariser. Adjacent polarisers have their polarizing directions arranged orthogonally. The pitch of the individual polariser strips is equal to the pitch of the pixels.

DE 3 203 339 discloses a stereoscopic display in which a vertically striped polariser is used in front of a television screen.

SUMMARY OF THE INVENTION

According to the invention, there is provided a stereoscopic display comprising a spatial light modulator having an array of picture elements and a retarder array having horizontally alternating first and second vertically extending stripes, the first and second stripes being arranged to supply light from the modulator with first and second polarisations, respectively, which are different from each other, characterized in that each of the first and second stripes has a width which is greater than the horizontal pitch of the picture elements.

The width of each of the first and second stripes may be substantially equal to twice the horizontal pitch of the picture elements. The picture elements may be arranged as groups of four in horizontally and vertically adjacent pairs and the picture elements of each group may comprise red, green, green or white, and blue picture elements.

The width of each of the first and second stripes may be substantially equal to three times the horizontal pitch of the picture elements. The picture elements may be arranged as horizontally adjacent triplets of red, green and blue picture elements, each triplet being aligned with a respective first or second stripe. The green picture element may be disposed between the red and blue picture elements of each triplet. Each of the red and blue picture elements may be narrower than the green picture element of each triplet.

The display may comprise a lenticular screen, each of whose lenticules is cylindrically converging and extends vertically, the horizontal pitch of the lenticules being substantially equal to the horizontal pitch of the picture elements. The lenticular screen may have a non-flat surface adjacent the modulator or the retarder.

The modulator may be arranged to provide controllable attenuation of light. The modulator may comprise a liquid crystal device.

The modulator may be of reflective type.

The second polarisation may be substantially orthogonal to the first polarisation.

It is also possible for the modulator to be a light-emitting modulator, such as an electroluminescent or field emission display.

The modulator may be arranged to supply linearly polarised light to the retarder array with the light being polarised parallel or perpendicular to a reference direction.

The first stripes may be arranged to rotate polarisation by 90° and the second stripes may be arranged not to change polarization. The first stripes may comprise half wave retarders. The halt wave retarders may have optic axes oriented at substantially 45° to the reference direction.

The first stripes may comprise first and second half wave retarders having optic axes oriented at substantially 22.5° and substantially 67.5°, respectively, to the reference direction.

The first and second stripes may comprise half wave retarders whose optic axes are oriented at substantially +22.5° and substantially −22.5°, respectively, to the reference direction. The first and second stripes may comprise a further half wave retarder whose optic axis is oriented at substantially 67.5° to the reference direction.

The first and second stripes may comprise half wave retarders whose optic axes are oriented at substantially +67.5° and substantially −67.5°, respectively, to the reference direction and a further half wave retarder whose optic axle is substantially parallel to the reference direction.

The first and second stripes may comprise quarter wave retarders whose optic axes are oriented at substantially +45° and substantially −45°, respectively, to the reference direction and a further quarter wave retarder whose optic axis is oriented at substantially 45° to the reference direction.

The display may comprise viewing spectacles having first and second linear polarisers with mutually orthogonal polarising directions.

The first and second stripes may comprise quarter wave retarders whose optic axes are oriented at substantially +45° and substantially −45°, respectively, to the reference direction. The display may comprise viewing spectacles having first and second quarter wave retarders whose optic axes are oriented, in use, at substantially +45° and substantially −45°, respectively, to the reference direction and first and second linear polarisers with substantially parallel polarising direction.

The display may comprise viewing spectacles having first and second half wave retarders whose optic axes are oriented, in use, at substantially +67.5° and substantially −67.5°, respectively, to the reference direction and first and second linear polarisers with substantially parallel polarising directions. The first and second stripes may comprise a quarter wave retarder whose optic axis is oriented at substantially 90° to the reference direction. The spectacles may comprise a quarter wave retarder whose optic axis is oriented, in use, substantially parallel to the reference direction.

It is thus possible to provide a display which is easier to manufacture than the known types of displays, for example as shown in FIGS. 1 and 2 of the accompanying drawings. For example, the pitch of the retarder array compared to the pixel pitch is substantially longer than in the known displays and is therefore easier to fabricate, particularly as display resolution increases. Substantially increased vertical viewing freedom is provided so that such displays may be used, for example, as reflective displays which can be oriented to make best use of ambient lighting without suffering from undesirable visual artefacts. A display of this type maintains full spatial resolution when used in a 2D mode, for which it is merely necessary for an observer not to view the display through a stereoscopic viewing aid such as viewing spectacles.

Although the horizontal viewing freedom is more limited, this is not a disadvantage in many applications and is more than offset by the increased vertical viewing freedom. The use of a lenticular screen allows the horizontal viewing freedom to be increased.

In the case of the RGB colour triplet embodiment, horizontal crosstalk initially occurs in the red and blue components whereas the green component, which in general contains most of the luminance information, is substantially less affected. Thus, undesirable visual effects of crosstalk are substantially reduced. Further, this arrangement may be more convenient in terms of electronic or software implementation or compatibility in that each triplet represents a single composite colour pixel so that image data are supplied in turn horizontally for the composite colour pixels instead of interweaving the individual colour component pixels of adjacent left and right image data.

BRIEF DESCRIPTION OF THE DRAWINGS

The invention will be further described, by way of example, with reference to the accompanying drawings, in which:

FIG. 7 illustrates the effects of crosstalk in the display of FIG. 5a;

FIG. 12 is a diagrammatic frost view of a display constituting a sixth embodiment of the invention;

FIG. 13 is a diagrammatic front view of a display constituting a seventh embodiment of the invention;

DESCRIPTION OF THE PREFERRED EMBODIMENTS

All of the displays described hereinafter are of the reflective type. However, it is equally possible to provide displays of the transmissive type.

Figure 5A:
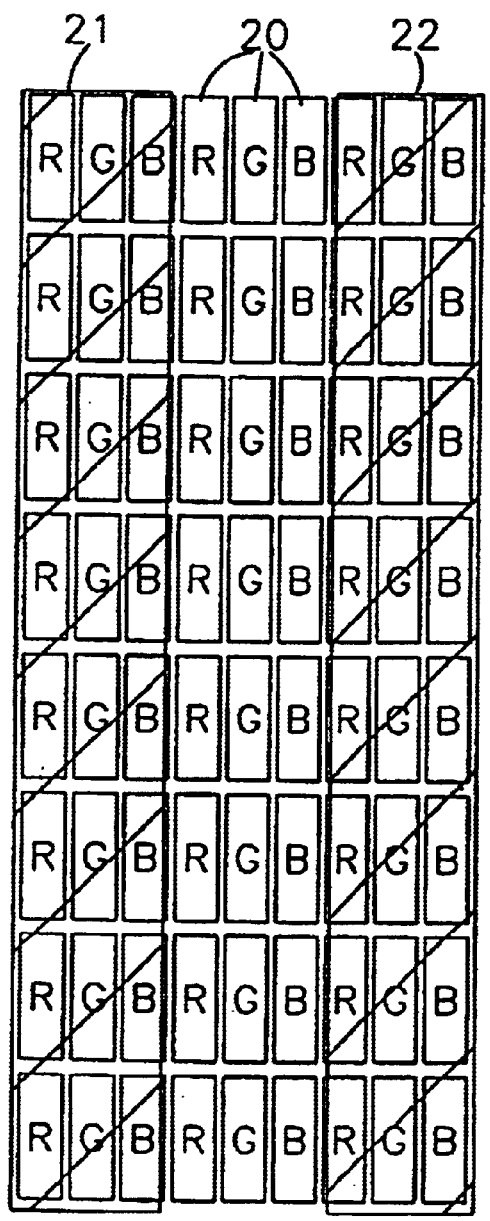
FIG. 5a is a diagrammatic front view of a display constituting a first embodiment of the invention.

A reflective display is illustrated in FIG. 5a and comprises a spatial light modulator of the liquid crystal type comprising a rectangular array of red, green and blue pixels R, G, B, respectively. The pixels are arranged as horizontally adjacent triplets in each row, one such triplet being indicated at 20. A retarder array is disposed in front of the SLM and comprises vertical stripes. In particular, the retarder array comprises first stripes such as 21 and 22 which alternate horizontally with second stripes (illustrated as being clear in FIG. 5a). The width of each of the stripes is substantially equal to three times the horizontal pitch of the pixels R, G, B so that each is disposed in front of and aligned with a respective column of triplets of individual pixels forming a column of composite colour pixels. In practice, the widths of the retarder stripes may be slightly less than three times the pitch of the individual pixels so as to provide view point correction as described hereinbefore.

The widths of the individual pixels R, G, B of the display shown in FIG. 5a are the same.

Figure 1:
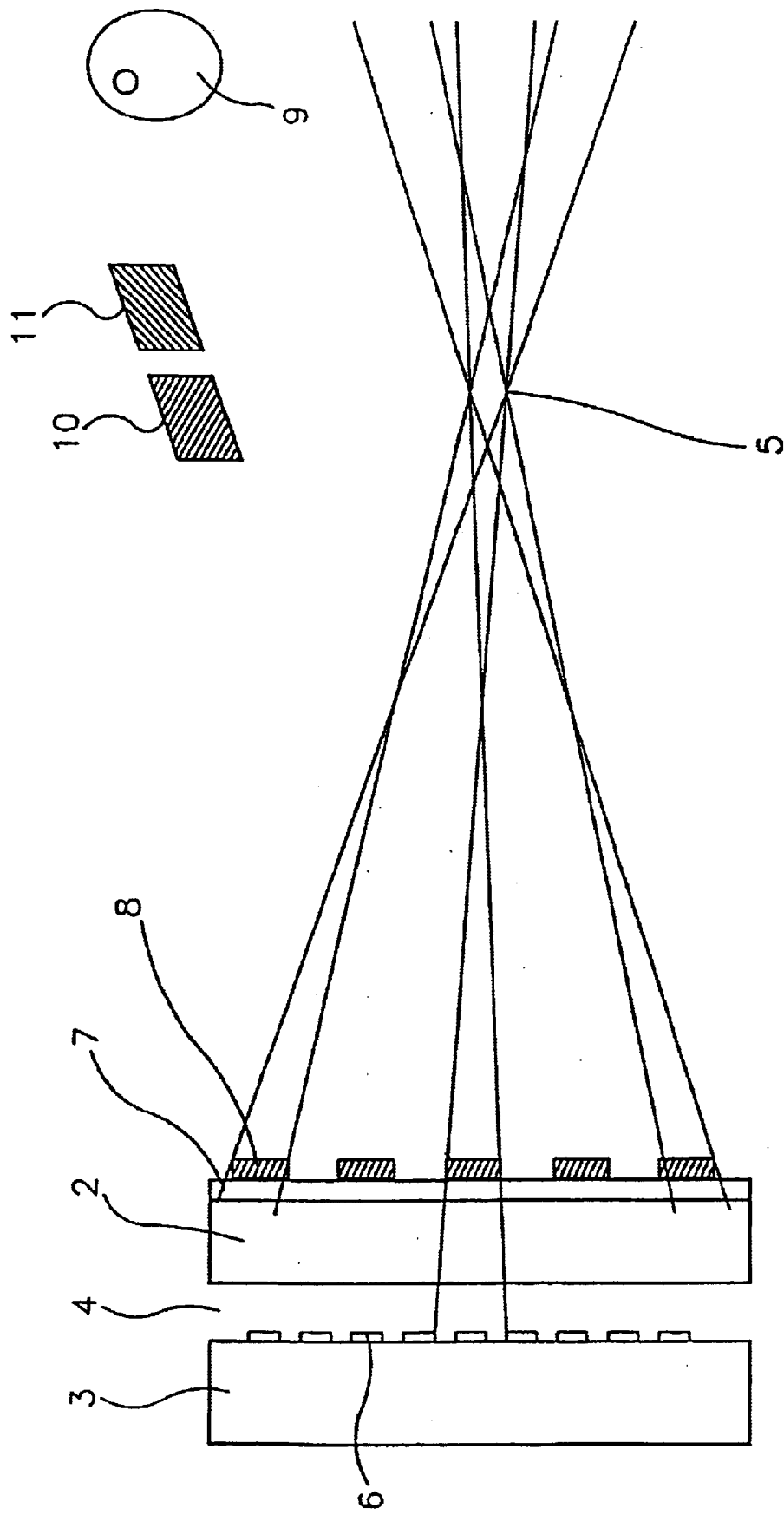
FIG. 1 is a diagrammatic vertical cross sectional view of a first known type of stereoscopic display.
Figure 2:
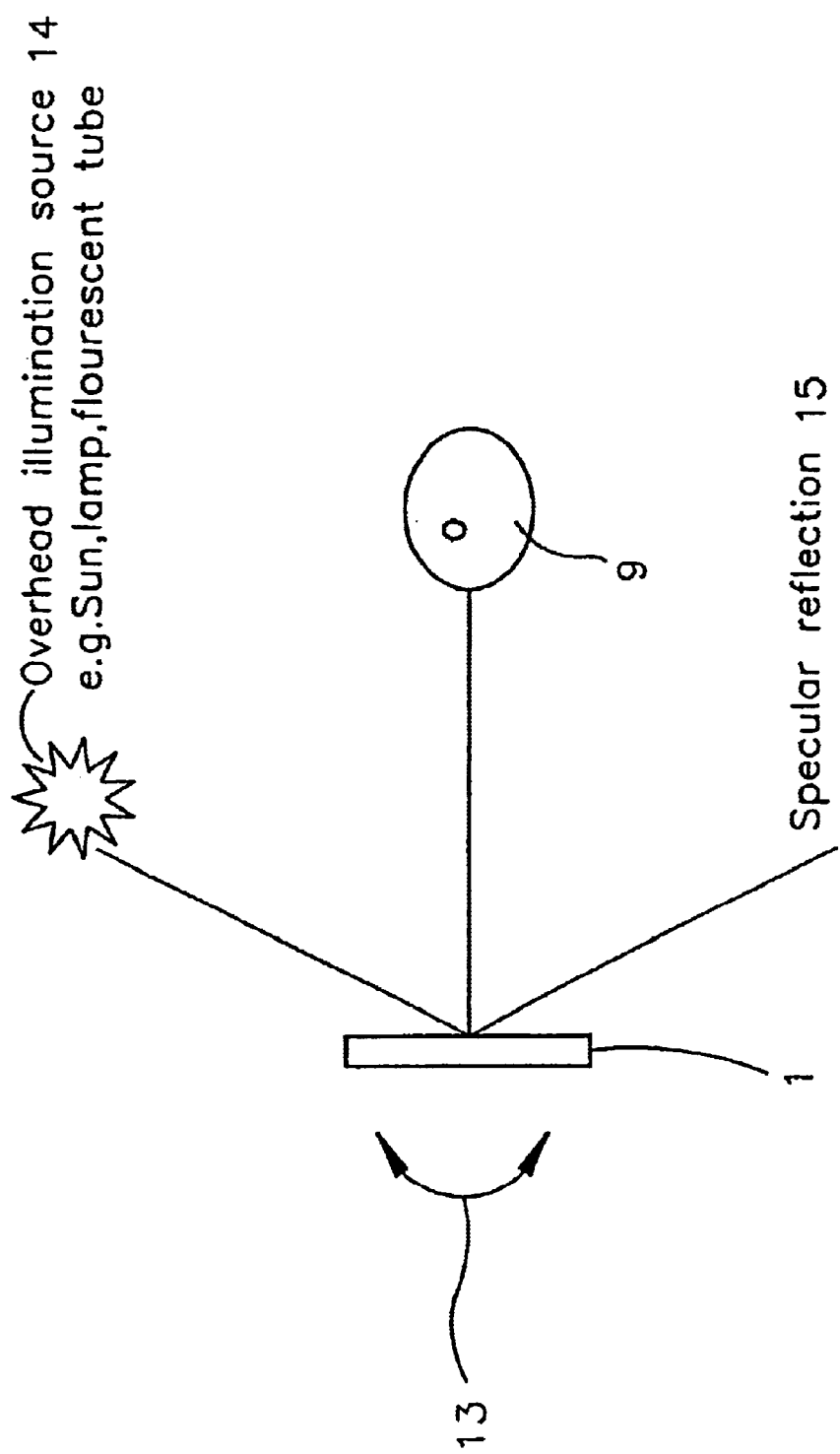
FIG. 2 is a diagram illustrating how a reflective display may be used.
Figure 3:
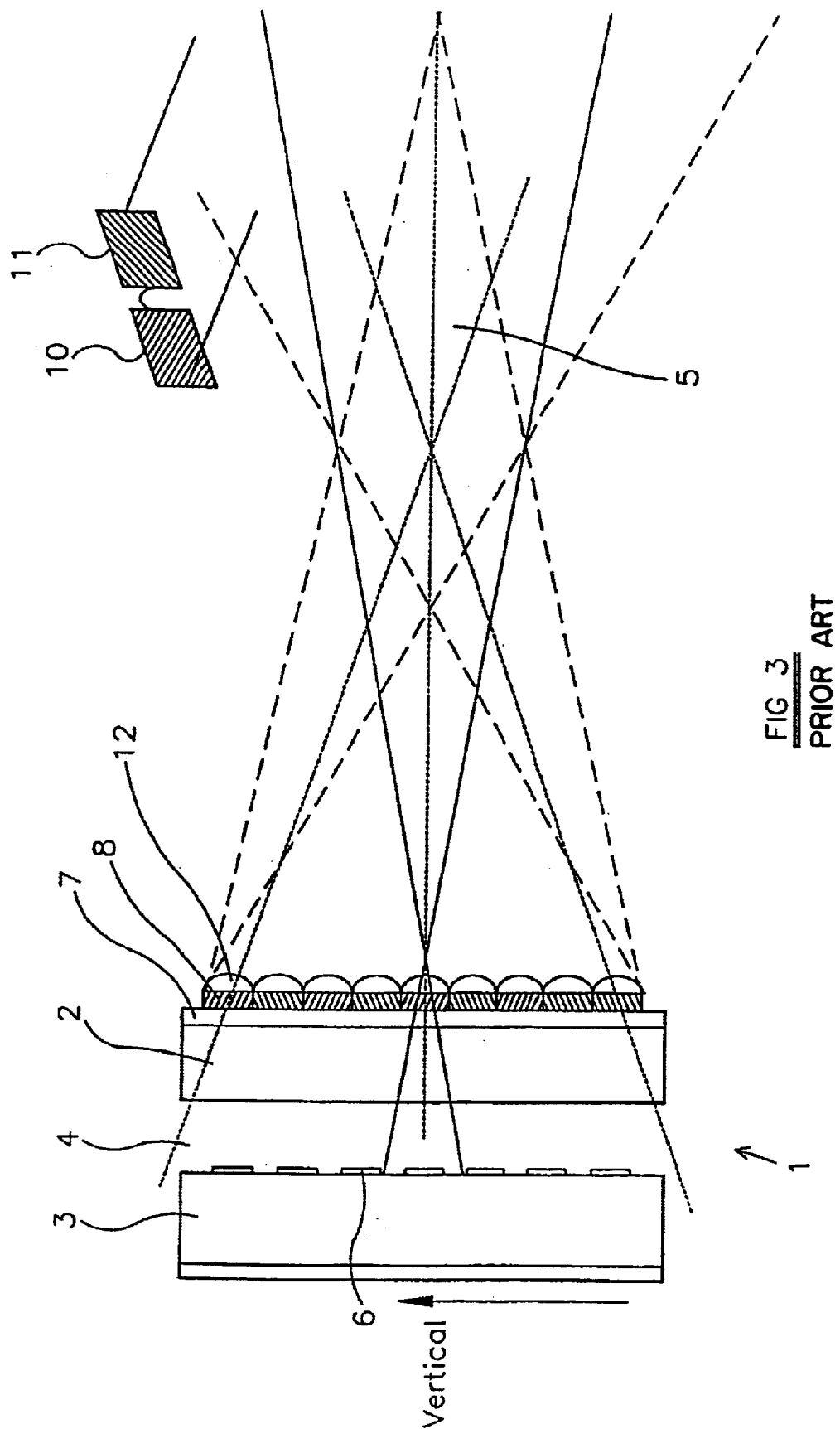
FIG. 3 is a diagrammatic vertical cross sectional view of a second known type of stereoscopic display.

The arrangement of the pixels and vertical retarder stripes shown in FIG. 5a provides much greater vertical viewing freedom than for the known displays, for example as shown in FIGS. 1 and 3. Such a display is therefore very suitable for use in the reflective mode and in hand-held equipment, although the horizontal freedom of movement is more restricted. Crosstalk resulting from parallax in the horizontal direction is not achromatic and is therefore reduced as illustrated in FIG. 7.

Figure 5B:
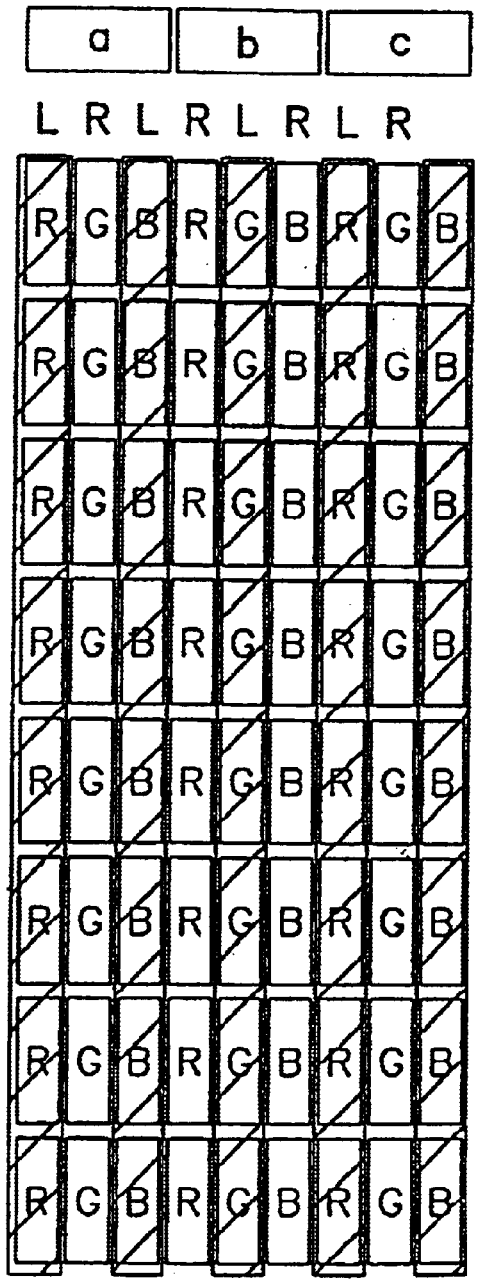
FIG. 5b is a view similar to FIG. 5a illustrating how left and right colour component pixel information would need to be interleaved in a known type of display.

The display illustrated in FIG. 5a has a further advantage over displays of the type illustrated in FIG. 1 (when the retarder stripes are vertical). In particular, for displays of the type shown in FIG. 1, the left and right colour component pixel information would need to be interleaved on a pixel by pixel basis as illustrated in FIG. 5b. However, in the arrangement shown in FIG. 5a, the left and right view information is interleaved on a composite colour pixel basis. In other words, the three colour components for one of the views are supplied to three adjacent individual colour pixels. This allows the supply of left and right image data to the display to be simplified.

Figure 6:
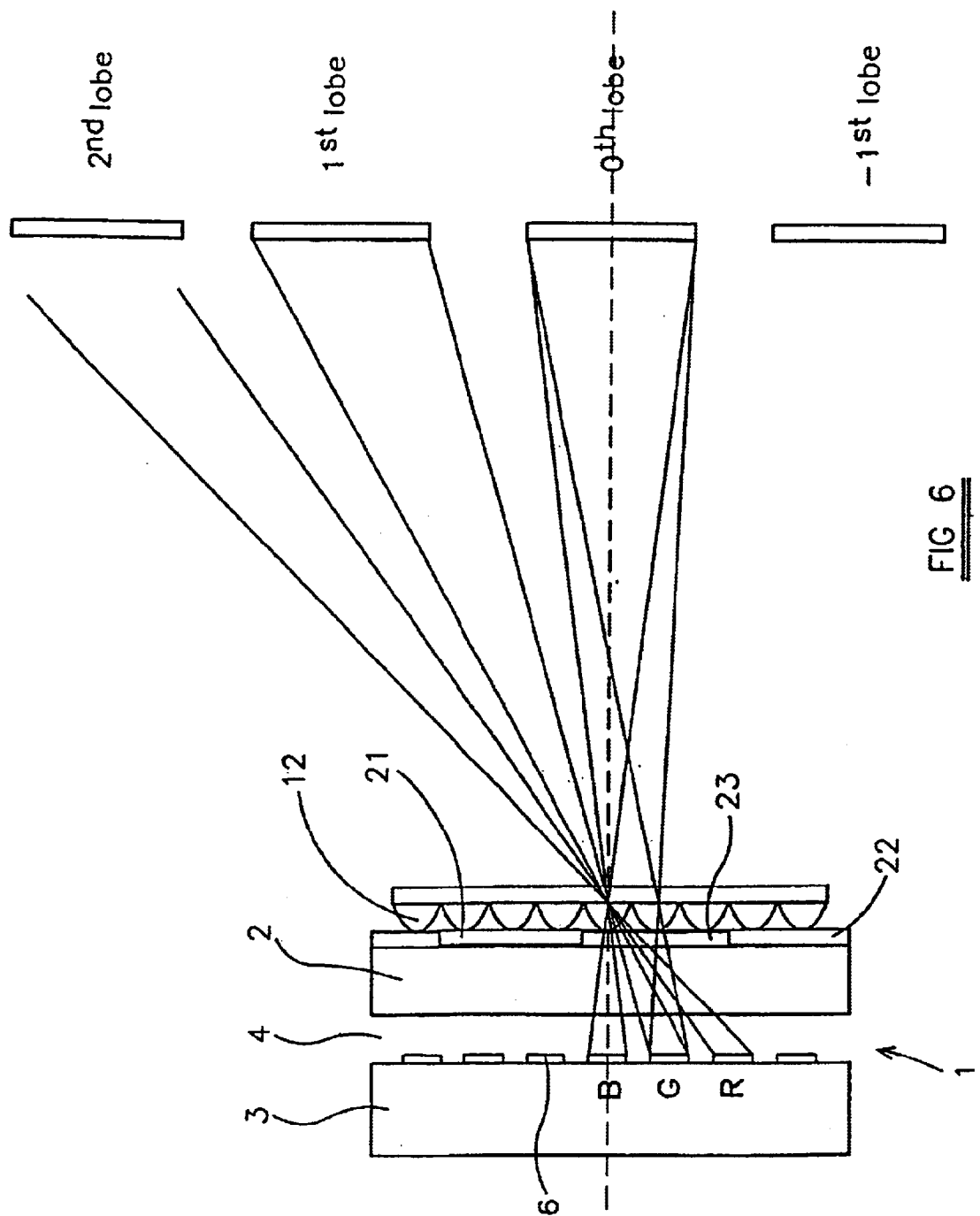
FIG. 6 is a horizontal cross sectional view of the display of FIG. 5a illustrating the generation of lobes.

FIG. 6 illustrated the creation of several lobes which repeat the viewing windows with lateral spacing at the viewing plane. The zero order lobe corresponds to Imaging of the pixels directly below the lenticular elements of the lenticular screen 12. However, each such lenticule images adjacent composite pixels into different order lobes, each of which permits orthoscopic viewing over three lobes (as shown in FIG. 7). This differs from the arrangement shown in FIG. 3, where the lobes generated at either side of the orthoscopic viewing zone contain light which has not passed through the correct retarder stripe, thus creating pseudoscopic zones in which the left and right images are reversed.

Figure 4:
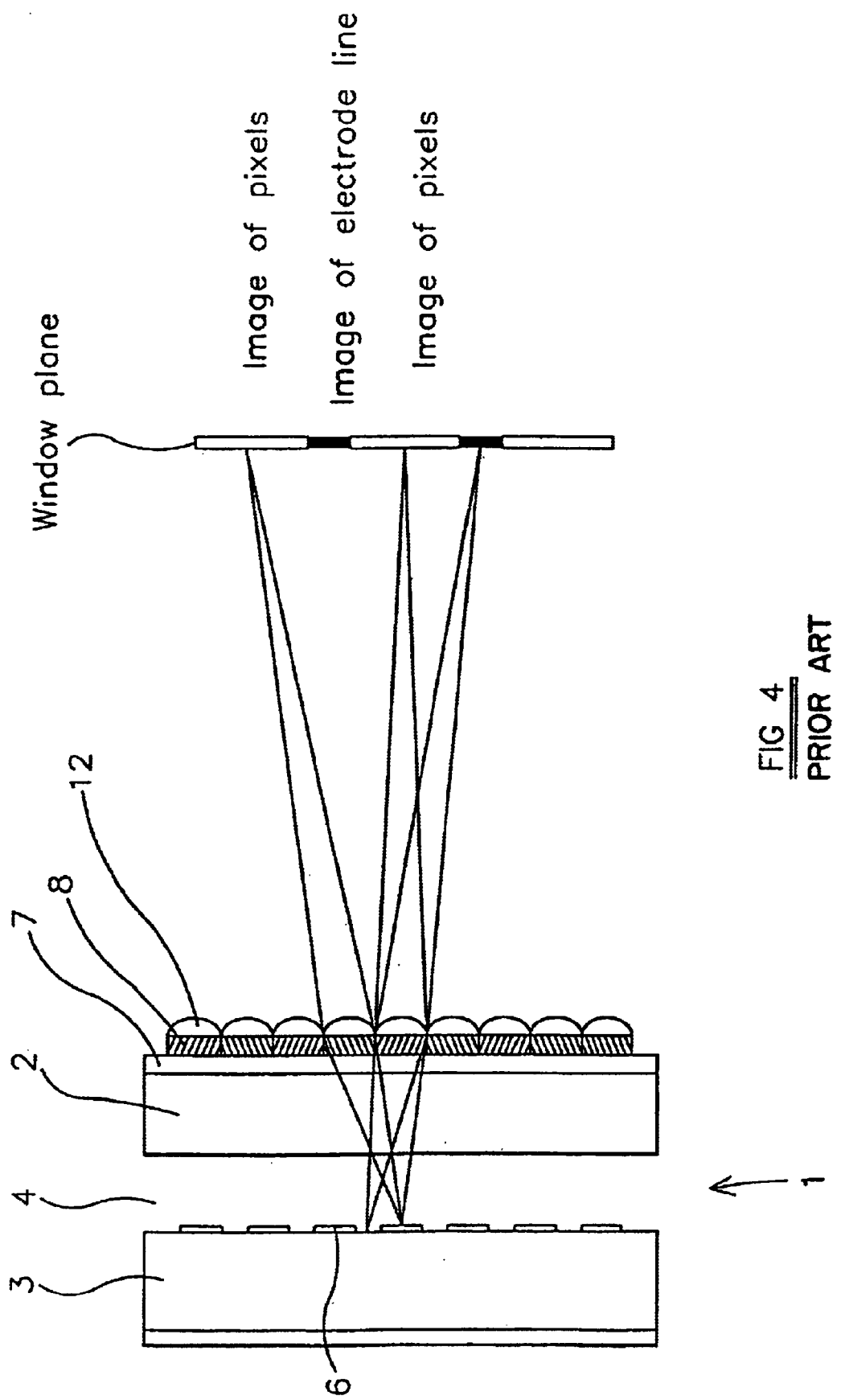
FIG. 4 is a view similar to FIG. 3 but illustrating the creation of intensity artefacts.
Figure 7:
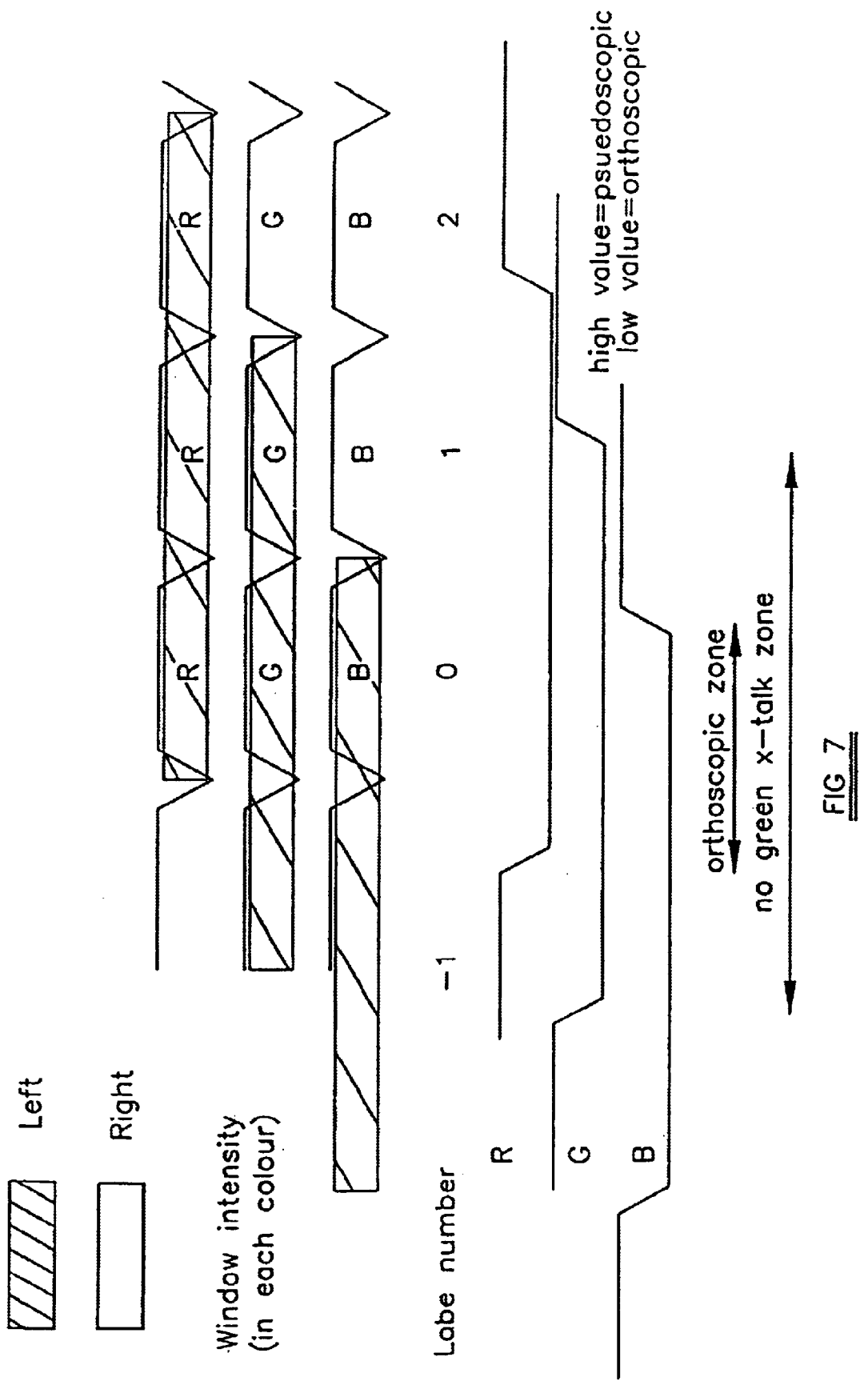

FIG. 7 illustrates the effects of crosstalk in the display of FIG. 5a. The intensity of each colour across the lobes in the window plane is illustrated diagrammatically in the upper part of FIG. 7. The dips in intensity at the edges of each lobe correspond to imaging of opaque regions between the columns of pixels. With the green pixels being disposed as the centre pixel of each of the composite pixels an shown in FIG. 4, the +1, 0 and −1 lobes of the green pixels contain green light of the same polarisation, for example corresponding to the left image. The 0, 1 and 2 lobes contain red data of the same polarisation and the −2, −1 and 0 lobes contain blue data of the same polarization.

The lower part of FIG. 7 indicates pseudoscopic zones with a high value and orthoscopic zones with a low value so as to illustrate the viewing windows generated by the display of FIG. 5a. The orthoscopic zone is surrounded by a wide zone which is free from crosstalk in the green part of the image, which is generally the high luminance component. In the case of displays of the type shown in FIG. 3, each orthoscopic zone is surrounded by a fully pseudoscopic zone. Thus, the arrangement illustrated in FIG. 5a provides better freedom from pseudoscopic viewing.

If it were desired to reduce the crosstalk in the red or blue colours rather than the green colours, then the red or blue pixel could be disposed at the centre of each composite pixel.

Figure 8:
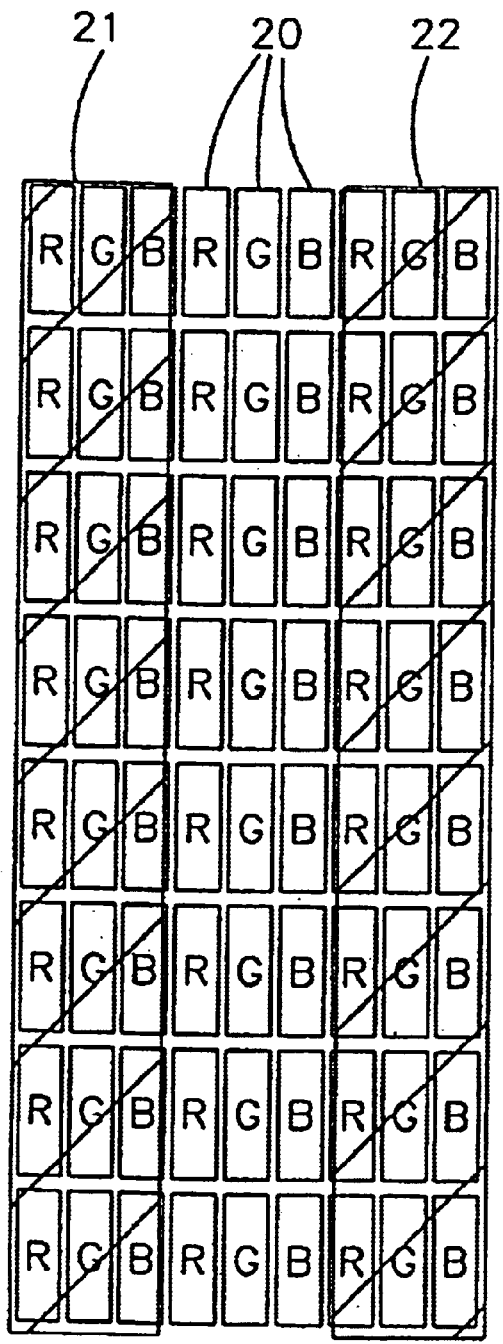
FIG. 8 is a diagrammatic front view of a display constituting a second embodiment of the invention.

The display shown in FIG. 8 differs from that shown in FIG. 5a in that the red and blue pixels R, B are narrower than the green pixels G. Such an arrangement reduces the crosstalk for horizontal movement of an observer outside the viewing zone as compared with the display shown in FIG. 5a. Although this in achieved at the expense of a dimming artefact, the performance of the display of FIG. 8 may be more suitable for certain applications than that of the display of FIG. 5a.

Figure 9:
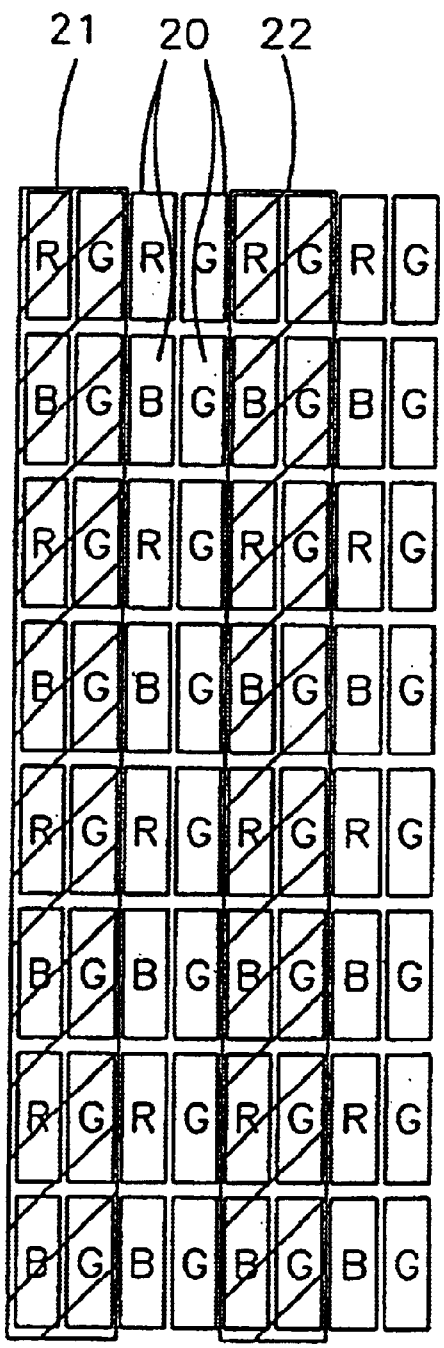
FIG. 9 is a diagrammatic front view of a display constituting a third embodiment of the inventions.

The display shown in FIG. 9 differs from that shown in FIG. 5a in that each of the retarder stripes is (apart from variations for viewpoint correction) substantially equal to twice the horizontal pitch of the individual pixels. Also, each composite colour pixel 20 comprises four individual colour component pixels in the form of a red pixel R, a blue pixel B and two green pixels G. Alternatively, one of the green pixels may be replaced by a white pixel. Also, each composite pixel comprises vertically and horizontally adjacent pairs. FIG. 9 illustrates a particular layout in which the green pixels G are disposed in the same vertical column with the red and blue pixels being disposed in an adjacent column.

Such an arrangement provides the substantially increased vertical viewing freedom as with the displays shown in FIG. 5 and 8. Although the horizontal crosstalk is reduced, the reduction is not as large as for the displays shown in FIGS. 5a and 8.

Figure 10:
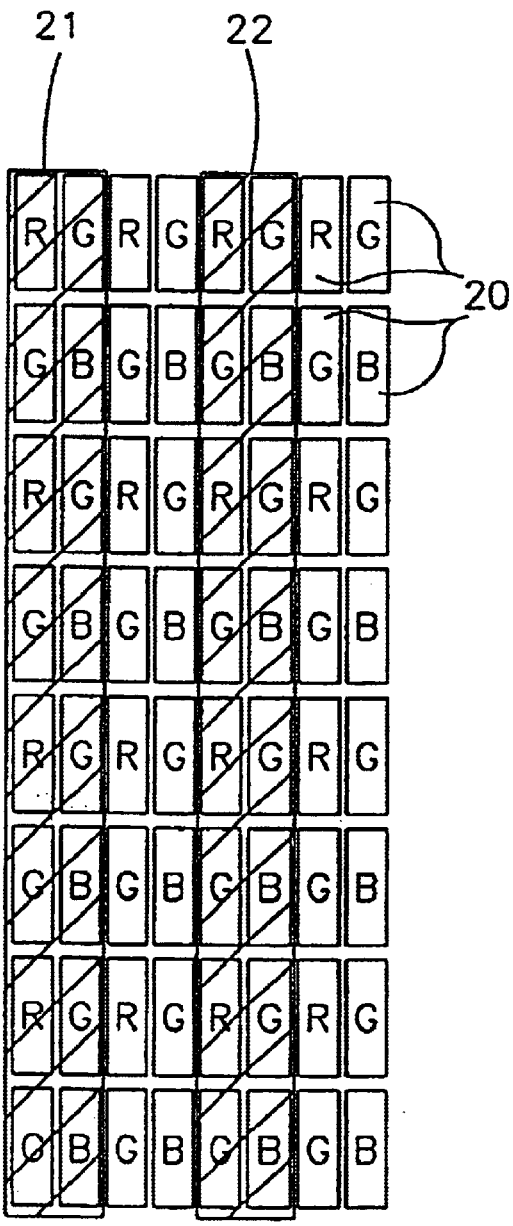
FIG. 10 is a diagrammatic front view of a display constituting a fourth embodiment of the invention.

The display shown in FIG. 10 differs from that shown in FIG. 9 in that the green pixels G of each composite pixel 20 are disposed diagonally with respect to each other.

Figure 11:
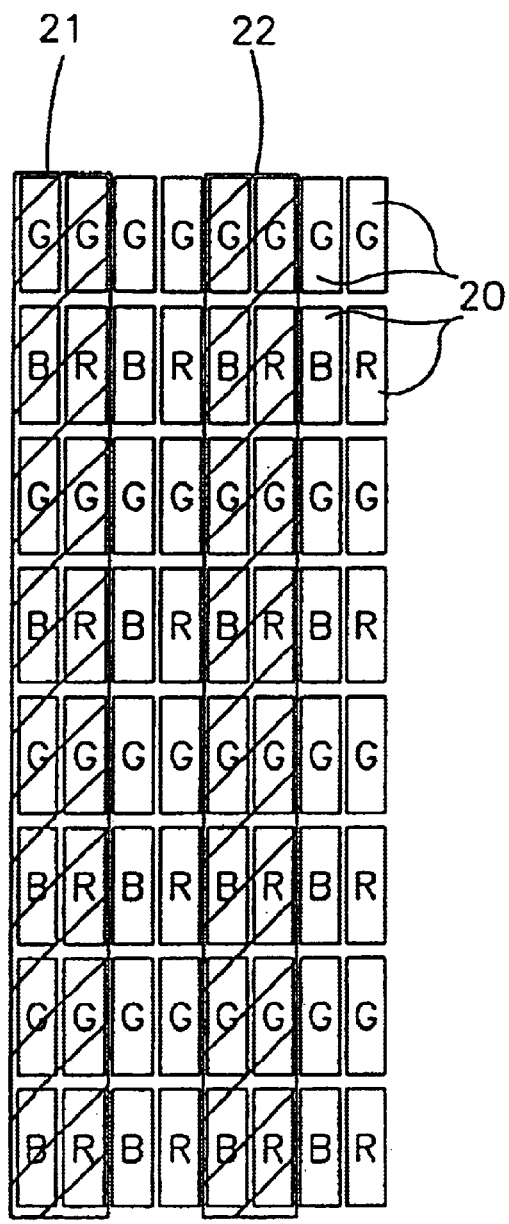
FIG. 11 is a diagrammatic front view of a display constituting a fifth embodiment of the invention.

Similarly, the display shown in FIG. 11 differs from that shown in FIG. 9 in the individual pixel layout within each composite pixel 20. In this case, the green pixels G of each composite pixel 20 are disposed in the same row adjacent each other. Such an arrangement allows a simpler colour filter pattern to be used although more crosstalk occurs between green pixels than for the display shown in FIGS. 9 and 10.

FIG. 12 illustrates a display which differs from that shown in FIG. 9 only in that one of the green pixels G of each composite pixel 20 is replaced by a white or luminance pixel Y. Similarly, one of the green pixels of each composite pixel of the displays shown in FIGS. 10 and 11 may be replaced by a white pixel. In the arrangement shown in FIG. 12, crosstalk occurs between the white and blue pixels and between the green and red pixels of adjacent composite pixels. Such an arrangement may be preferable to crosstalk between green and white pixels.

FIG. 13 illustrates a display which differs from that shown in FIG. 5a in that it is provided with a lenticular screen 12. The lenticules of the screen 12 are cylindrically converging and extend vertically. The horizontal pitch of the lenticules is, subject to the needs of viewpoint correction, substantially equal to the horizontal pitch of the pixels RGB. Thus, each of the lenticules is substantially aligned with a respective column of pixels. This arrangement provides substantially increased horizontal viewing freedom while maintaining the increased vertical viewing freedom. The lenticular screen 12 may also be used with the displays illustrated in FIGS. 8 to 12 to provide increased horizontal viewing freedom.

Figure 18:
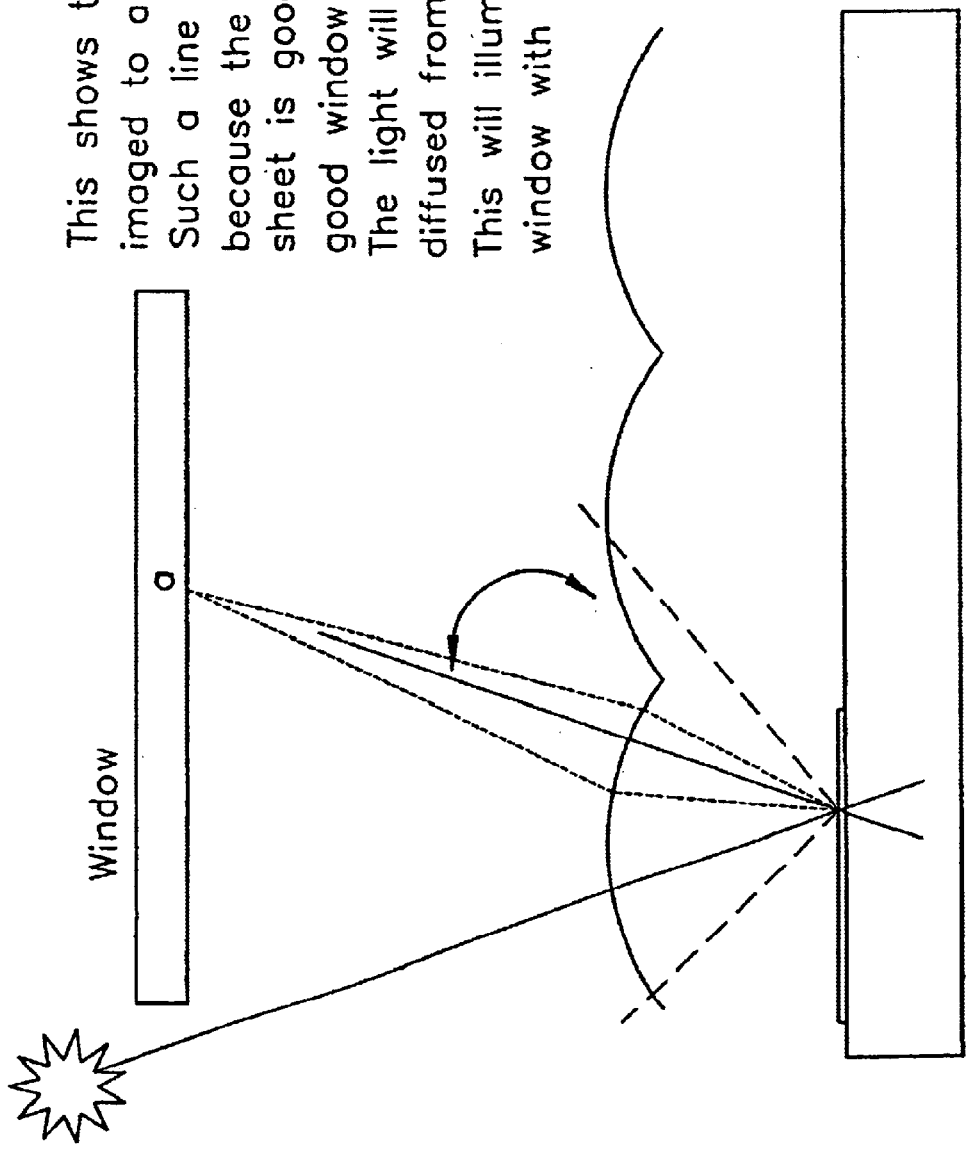
FIG. 18 is a diagram illustrating illustrating illumination of a reflective display by a bright point source.

As explained hereinbefore, the pixel behind each lenticule is imaged by the lenticular sheet to a window. In the case of a purely specular reflective pixel display, when the display is illuminated by a point source, such as the sun, the light source will be imaged to part of the window as illustrated at "a" in FIG. 18. The window will not be uniformly illuminated, and it is therefore preferable to illuminate the display with an extended source. If the pixel reflector incorporates a coarse diffusing element which can be resolved by the lenticular sheet (as typically used in commercial reflective displays), then a point source illumination is still imaged substantially to a point. However the intensity of light at that point is determined by the amount and direction of scatter from the surface. Some light for instance can be scattered into an adjacent lenticule and travel to an adjacent lobe. As an observer moves around the window plane both laterally and forward/backwards from the display, the point on the reflector surface at which reflection takes place varies and, if the scattering element is coarse, then the amount of light reaching the observer eyes also varies. There will therefore also be different and varying light levels in each eye as the observer moves. If the scattering element contains the same pattern within each pixel so that the scattering effect is correlated across the panel, then this effect is quite noticeable. It is therefore preferable to employ scattering elements which are not correlated pixel to pixel, at least in the horizontal direction. Optionally, a scattering reflector which is not resolved by the lenticular sheet may be used, in which case the scattering element at each pixel may be correlated or non-correlated with the other pixels.

Figure 14:
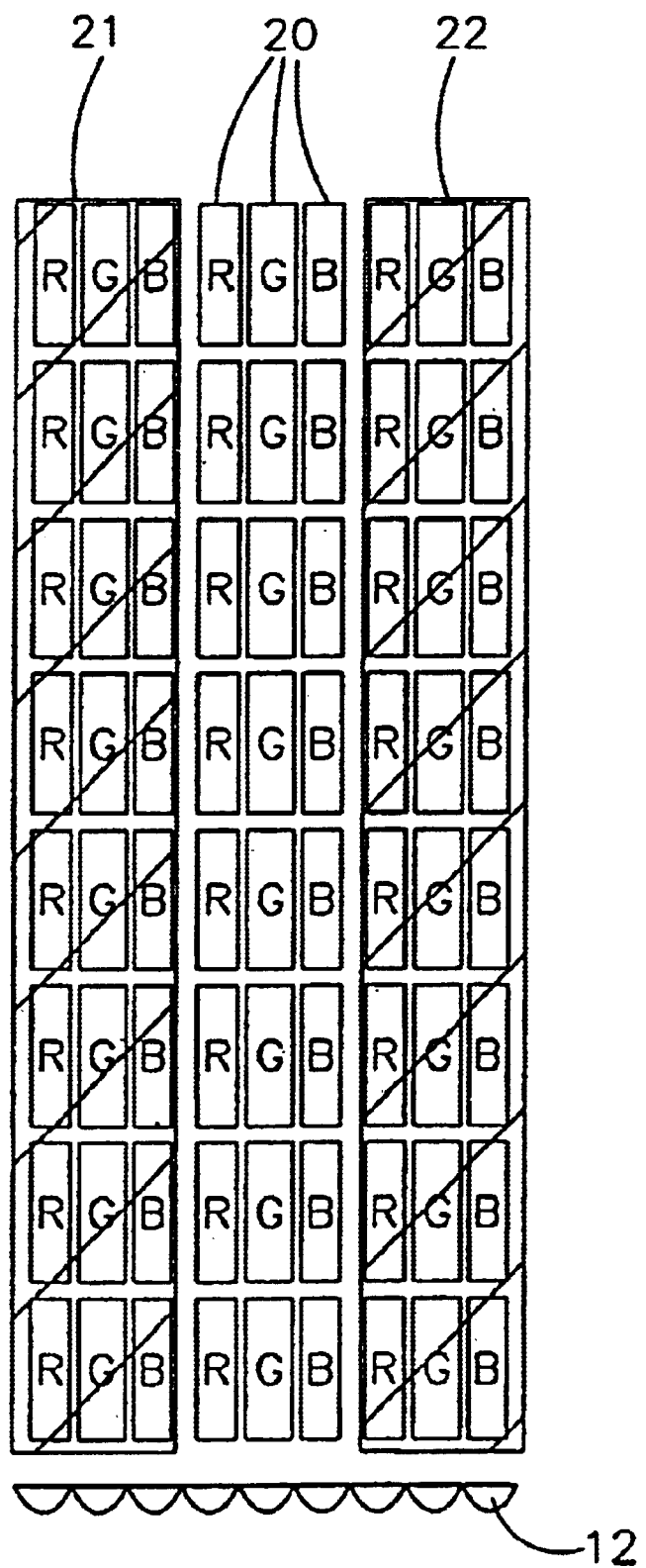
FIG. 14 is a diagrammatic front view of a display constituting an eighth embodiment of the invention.

The display shown in FIG. 14 illustrates how the lenticular screen 12 may be used with a display of the type shown in FIG. 8.

Figure 15:
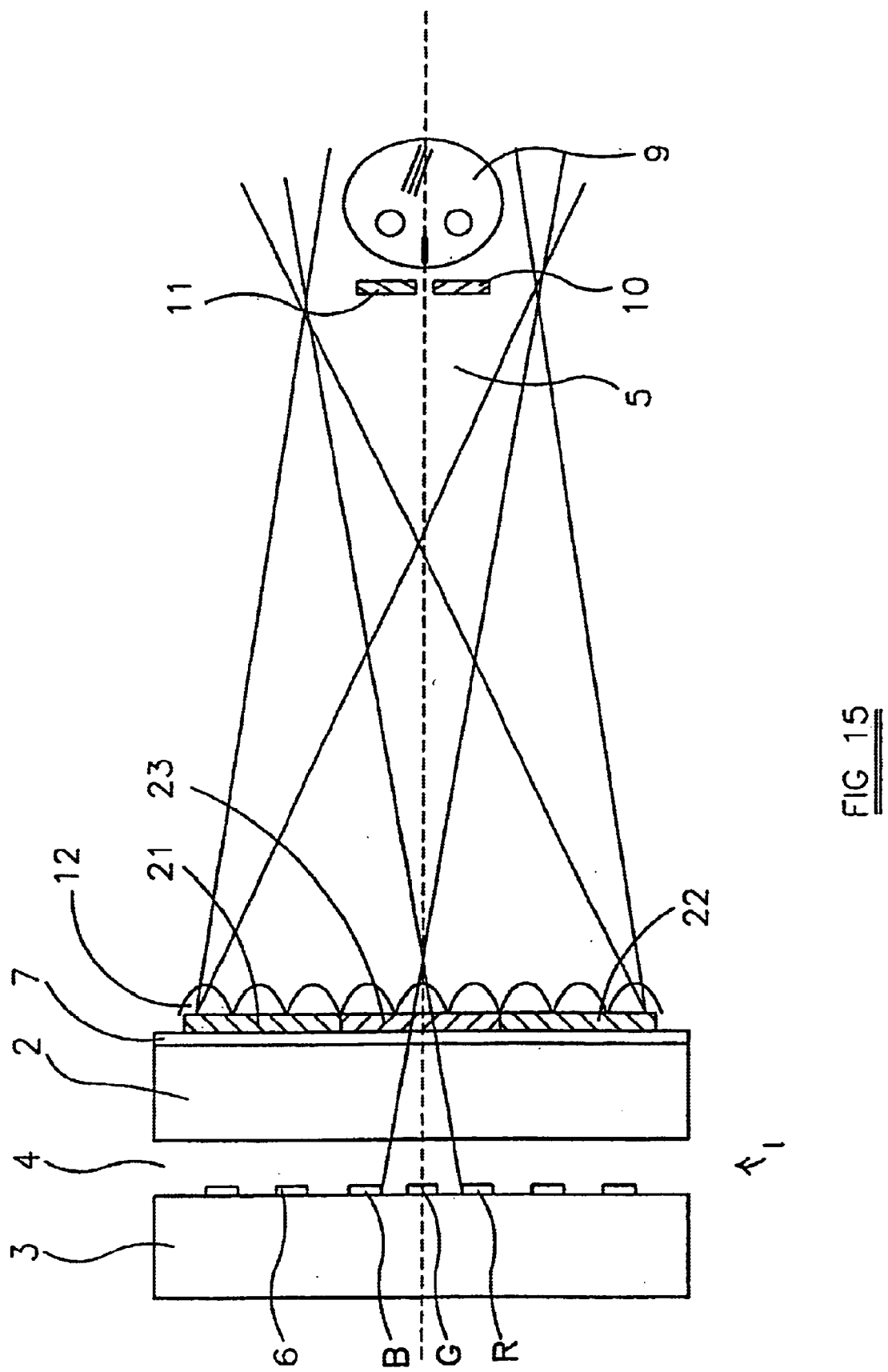
FIG. 15 is d diagrammatic horizontal cross sectional view of a display constituting a ninth is embodiment of the invention.

FIG. 15 illustrates the construction of a stereoscopic display in more detail. The display comprises a spatial light modulator (SLM) 1 in the form of a liquid crystal device with front and rear substrates 2 and 3 defining therebetween a cell containing a liquid crystal 4. The pixels 6 are arranged as R, G, B triplets as illustrated in FIG. 5a. The colour for the pixels may be provided by filters disposed on the substrate 2. The retarder array comprises the first stripes 21 and 22 and the second stripes 23 (only part of the display is shown in FIG. 15 for the sake of clarity). The SLM 1 has an output linear polariser 7 which supplies linearly polarized light to the retarder array. The first stripes 21 and 22 supply light from the SLM 1 to the observer 9 with a first polarisation whereas the second stripes 23 supply light with a second polarisation which is different from and preferably orthogonal to the first polarisation. The observer 9 wears viewing spectacles comprising polarisers 10 and 11. The requirements of the polarisers 10 and 11 are that they should transmit light, for example, from the first stripes and the second stripes, respectively, with minimum attenuation and as achromatically as possible whereas they should block light from the second and first stripes, respectively, as much and as achromatically as possible. The first stripes 21 end 22 are aligned with pixels which display left eye view information whereas the second stripes 23 are aligned with pixels which display right eye view information. Thus, provided the observer 9 is within the viewing zone 5, the 3D image can be viewed stereoscopically with minimum crosstalk and other visual artefacts. The viewing region 5 extends vertically so that the observer 9 has considerable vertical viewing freedom. The horizontal freedom is more restricted but the effects of crosstalk on visual disturbance may be reduced as described hereinbefore. In transmissive embodiments, the SLM 1 may include an input polariser (not shown) on the substrate 3.

Figure 16:
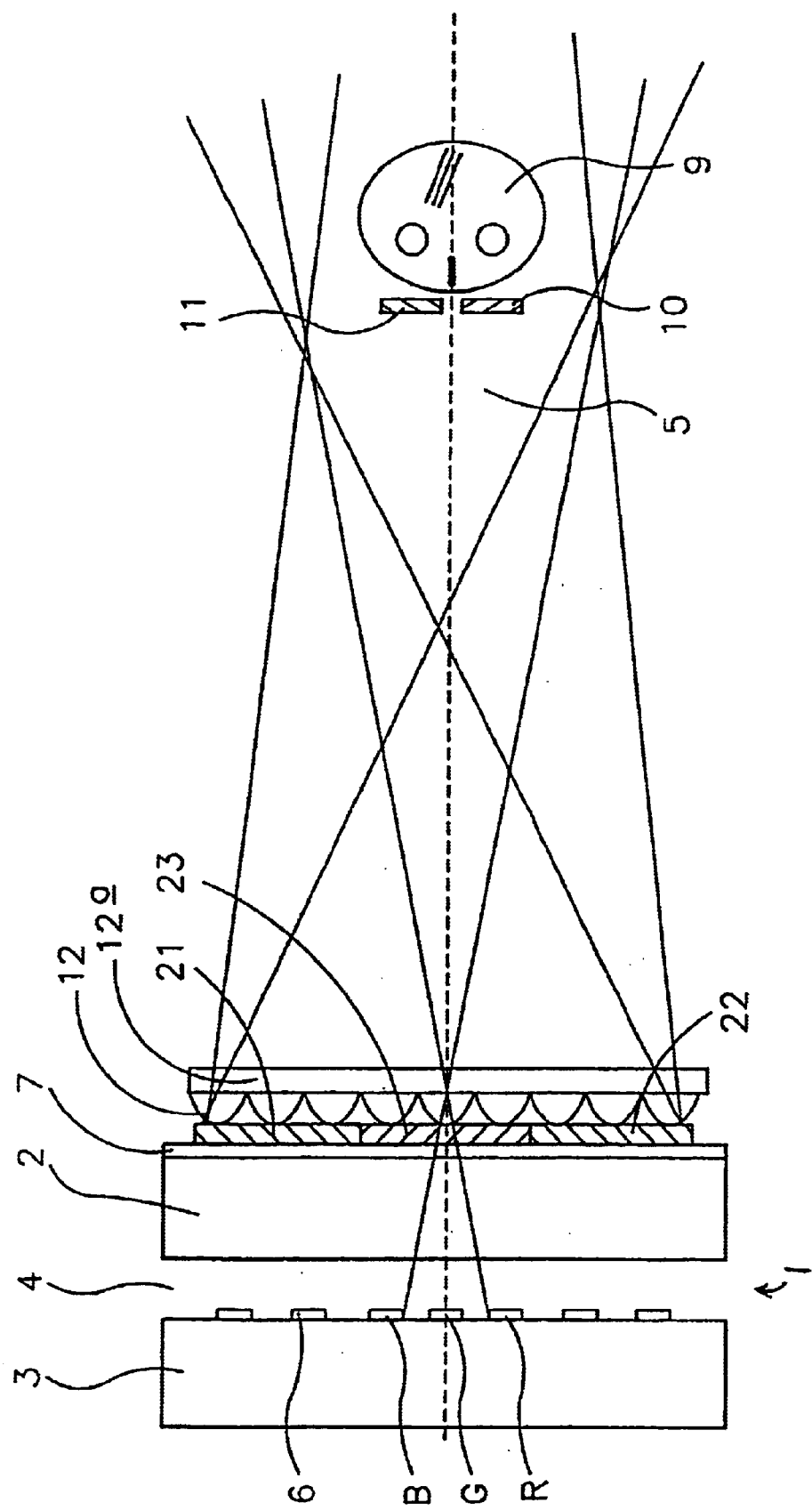
FIG. 16 is a diagrammatic horizontal cross sectional view of a display constituting a tenth embodiment of the invention.

The display shown in FIG. 16 differs from that shown in FIG. 15 in that the lenticular screen 12 is shown facing the other way such that its curved side is adjacent the retarder array comprising the stripes 21 to 23. Such an arrangement prevents the curved side from being clogged with contaminants so as to preserve the performance of the display. Also, where the lenticular screen 12 is formed on a substrate 12a of substantial thickness, the arrangement shown in FIG. 16 has reduced parallax as compared with an arrangement of the type shown in FIG. 15. This arrangement may have worse aberrational performance than that shown in FIG. 15 because the most curved surface is on the short conjugate side. It is difficult to provide an effective anti-reflection coating for the curved surface of a lenticular sheet.

Figure 17:
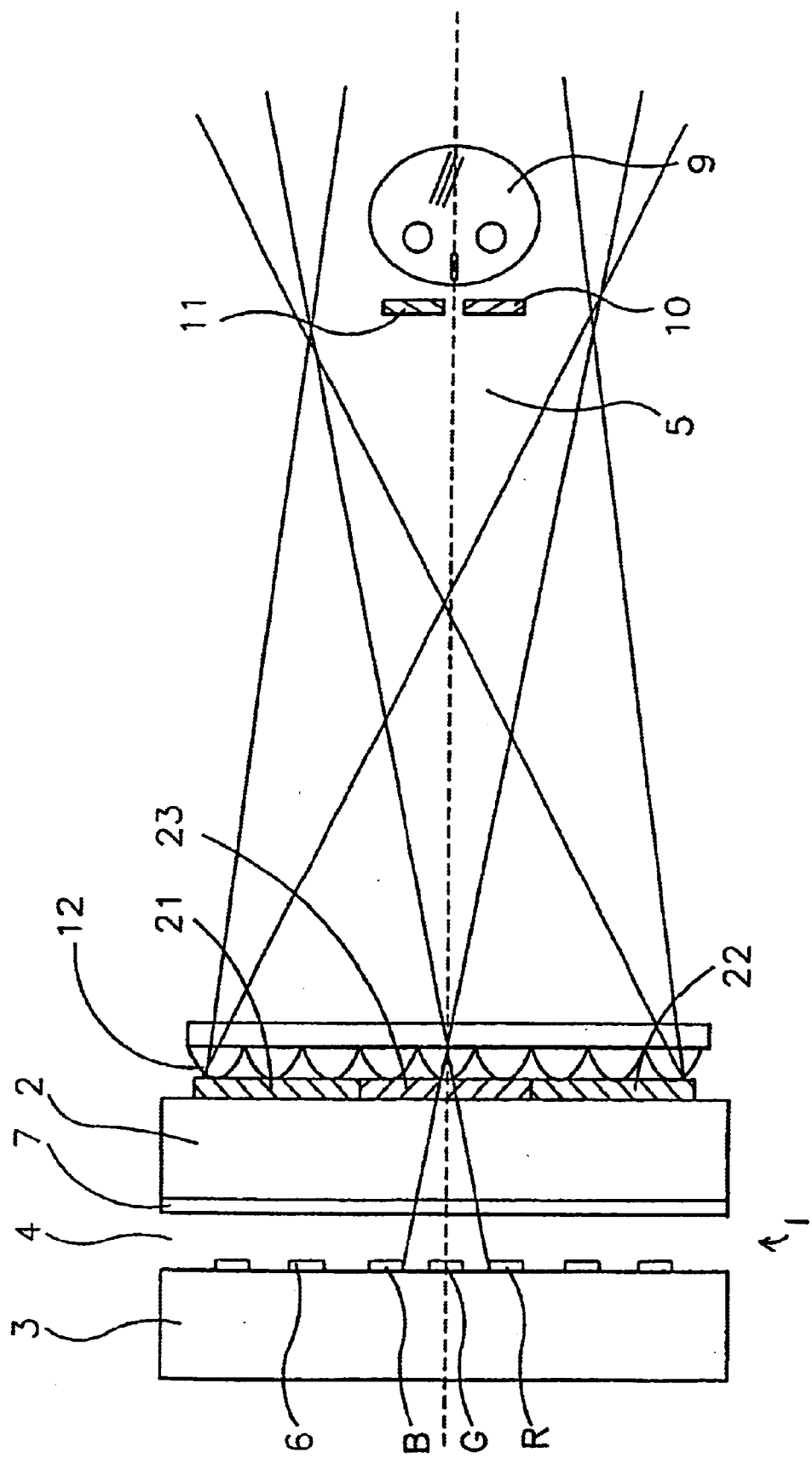
FIG. 17 is a diagrammatic horizontal cross sectional view of a display constituting an eleventh embodiment of the invention.

The display shown in FIG. 17 differs from that of FIG. 16 in that the polariser 7 is disposed internally or the liquid crystal device. Such an arrangement reduces the parallax between the pixels and the retarder array, particularly if the approximately 100 micron thick tri-cellulose acetate protection layers on either side of typical commercial polarisers are eliminated when the polariser is disposed internally. The reduced parallax allows an improvement in the minimum viewing distance.

Figure 19:
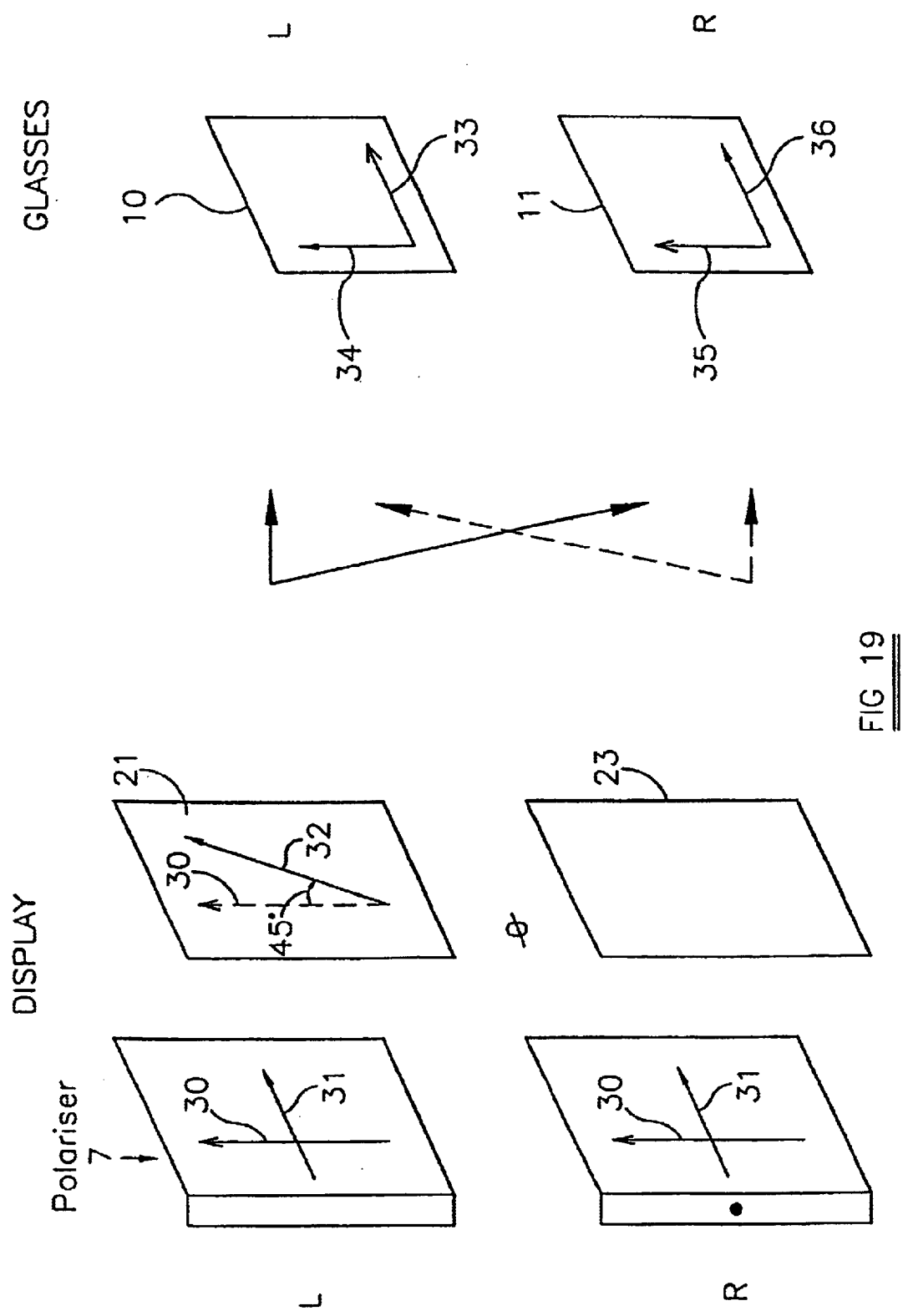
FIG. 19 is a diagrammatic view of part of a display constituting a thirteenth embodiment of the invention.

FIG. 19 illustrates an arrangement of the optical components of the display and of spectacles or glasses worn by the observer. The polariser 7 is uniform and has a polarisation axis 31 orthogonal to a reference direction so that light front the left image pixels L and the right image pixels R is transmitted with a (vertical) polarisation direction illustrated at 30 and corresponding to the reference direction. The polarisation axis 31 and the polarisation direction 30 may be rotated by 90° without affecting the operation of the display.

The first stripes 21 of the retarder array comprise half wave plates with an optic axis 32 oriented at 45° (in either direction) with respects to the reference direction 30. The vertically polarised light from the polariser 7 for the left image pixels is thus rotated so that the light supplied to the glasses by the first stripes 21 is horizontally polarised.

The second stripes 23 are arranged to have no effect on the polarisation of light from the polariser 7, which thus remains vertically polarised. For example, the second stripes 23 may be arranged to provide zero retardation. Alternatively, the second stripes may comprise half wave plates whose optic axis is parallel or perpendicular to the reference direction 30.

The polariser 10 for the left eye of the observer has a polarisation axis 34 which is substantially parallel to the reference direction 30 when the glasses are worn by an observer whose head is not tilted with respect to the display. Thus, the polariser 10 passes light of horizontal polarisation as indicated at 33 but attenuates light of vertical polarisation. Conversely, the polariser 11 for the right eye of the observer has a polarisation axis 36 which is perpendicular to the reference direction 30 and so passes vertically polarised light as indicated at 15.

The polariser 10 receives vertically polarised light from the left pixels L and transmits this to the left eye. However, the chromatic performance is determined by the chromatic performance of the half wave plate 21. The polarisation axis of the polariser 10 is perpendicular to the polarisation axis of the polariser 7 and the second stripes 23 have substantially no effect on the polarisation of light from the right pixels R. Thus, extinction of light from the right pixels is good.

The polariser 11 has its polarisation axis 36 parallel to the polarisation axis 31 of the polariser 7 so that the transmission of light from the right pixels R is good. In particular, the chromatic performance is a very good. However, because the extinction of light by the polariser 11 from the left pixels relies on the performance of the half wave plate first stripes 21, the chromatic performance is determined by the half wave plate. Accordingly, the performance of the optics for the left and right eyes of the observer is not equivalent with the arrangement shown in FIG. 19.

Figure 20:
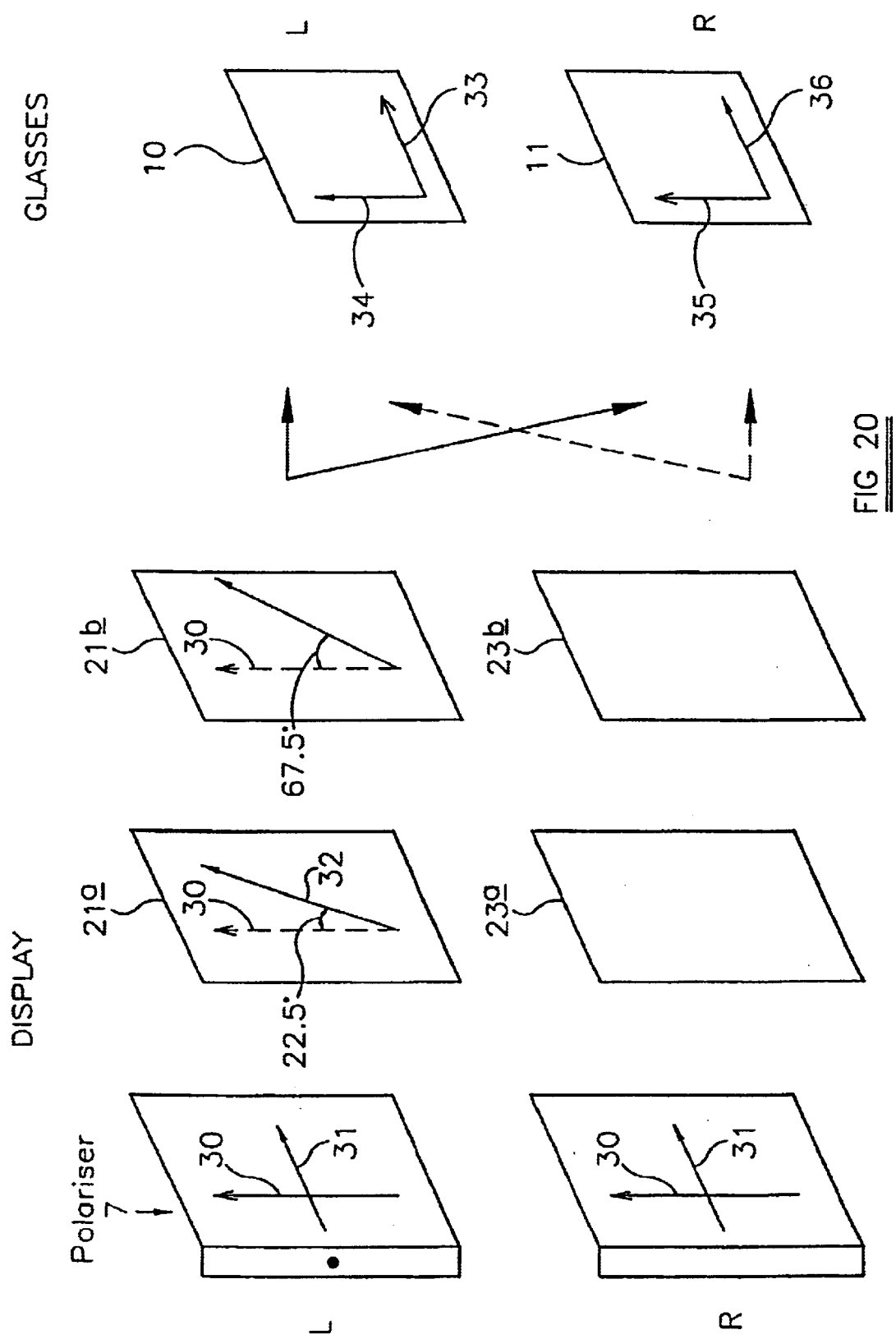
FIG. 20 is a diagrammatic view of part of a display constituting a fourteenth embodiment of the invention.

The arrangement shown in FIG. 20 differs from that shown in FIG. 19 in that the retarder array comprises a two stage retarder configuration to improve the chromatic performance. The first stripes comprise a first half waveplate 21a whose optic axis is oriented at 22.5° with respect to the reference direction 30 and a second half waveplate 21b whose optic axis is oriented at 67.5° in the same sense relative to the reference direction 30. The second stripes comprise two layers 23a and 23b which have no effect on polarisation. This arrangement improves the chromatic performance for the light transmitted by the polariser 10 and the light extinguished by the polariser 11. However, in each case, the chromatic performance is still dependent on the chromatic performance of the half wave plates 21a and 21b in combination so that the performance for the optics for the left and right eyes is not equivalent. Also, two patterned layers have to be aligned with each other to provide the retarder array.

Figure 21:
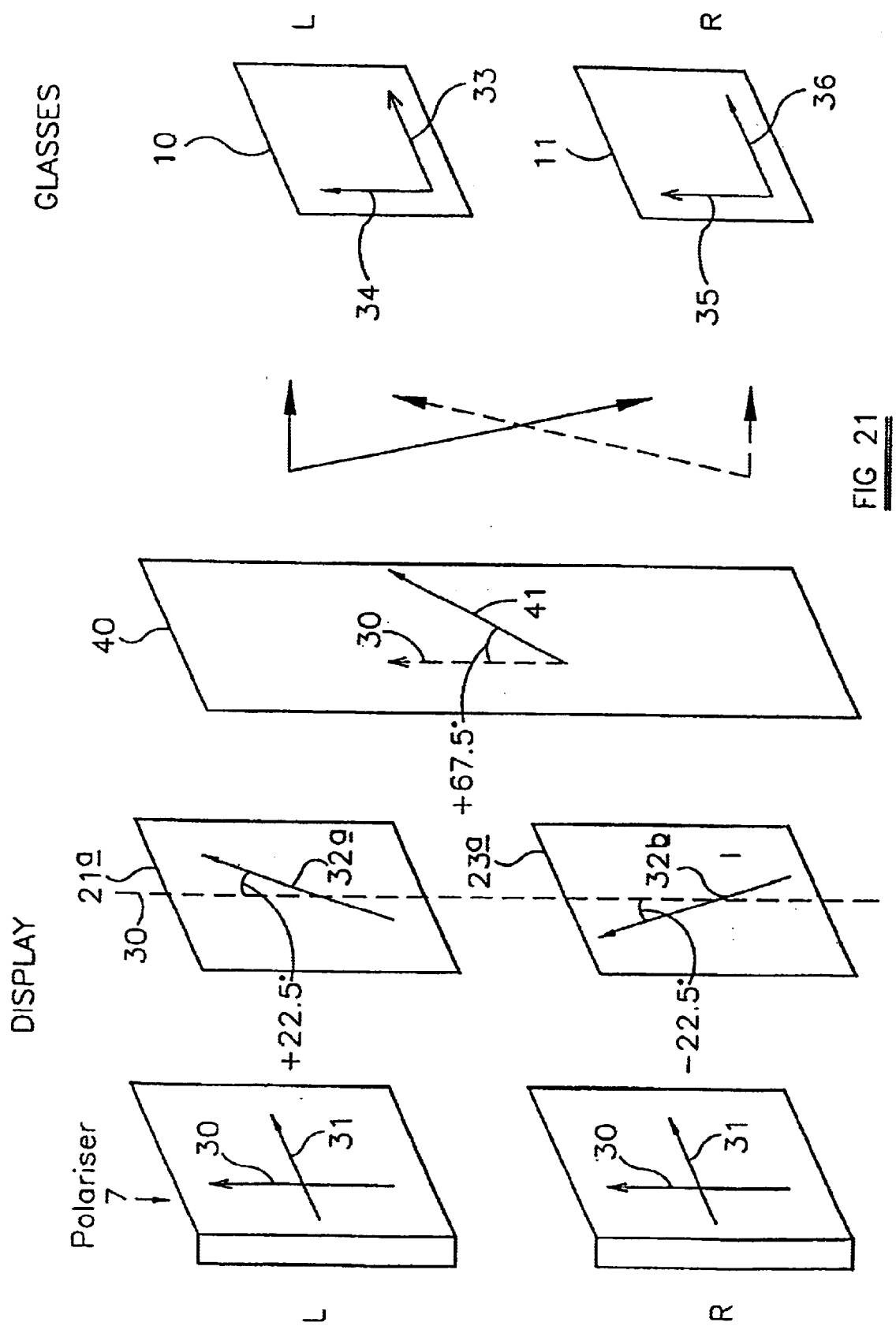
FIG. 21 to a diagrammatic view of part of a display constituting a fifteenth embodiment of the invention.

The arrangement shown in FIG. 21 differs from that shown in FIG. 20 in that the second stripes comprise a first layer 23a in the form of a half waveplate with its optic axis oriented at −22.5° with respect to the reference direction 30. Also, the second layer comprises a uniform half wave retarder 40 whose optic axis is oriented at +67.5° to the reference direction 30. In this case, the left eye sees transmission via a two stage retarder and crossed retarder extinction. The right eye sees crossed retarder transmission but two stage retarder extinction. Thus, the left eye sees good achromatic transmission but extinction limited by retarder performance whereas the right eye sees good transmission but limited extinction. Again, the performance of the optics for each eye is not equivalent.

Figure 22:
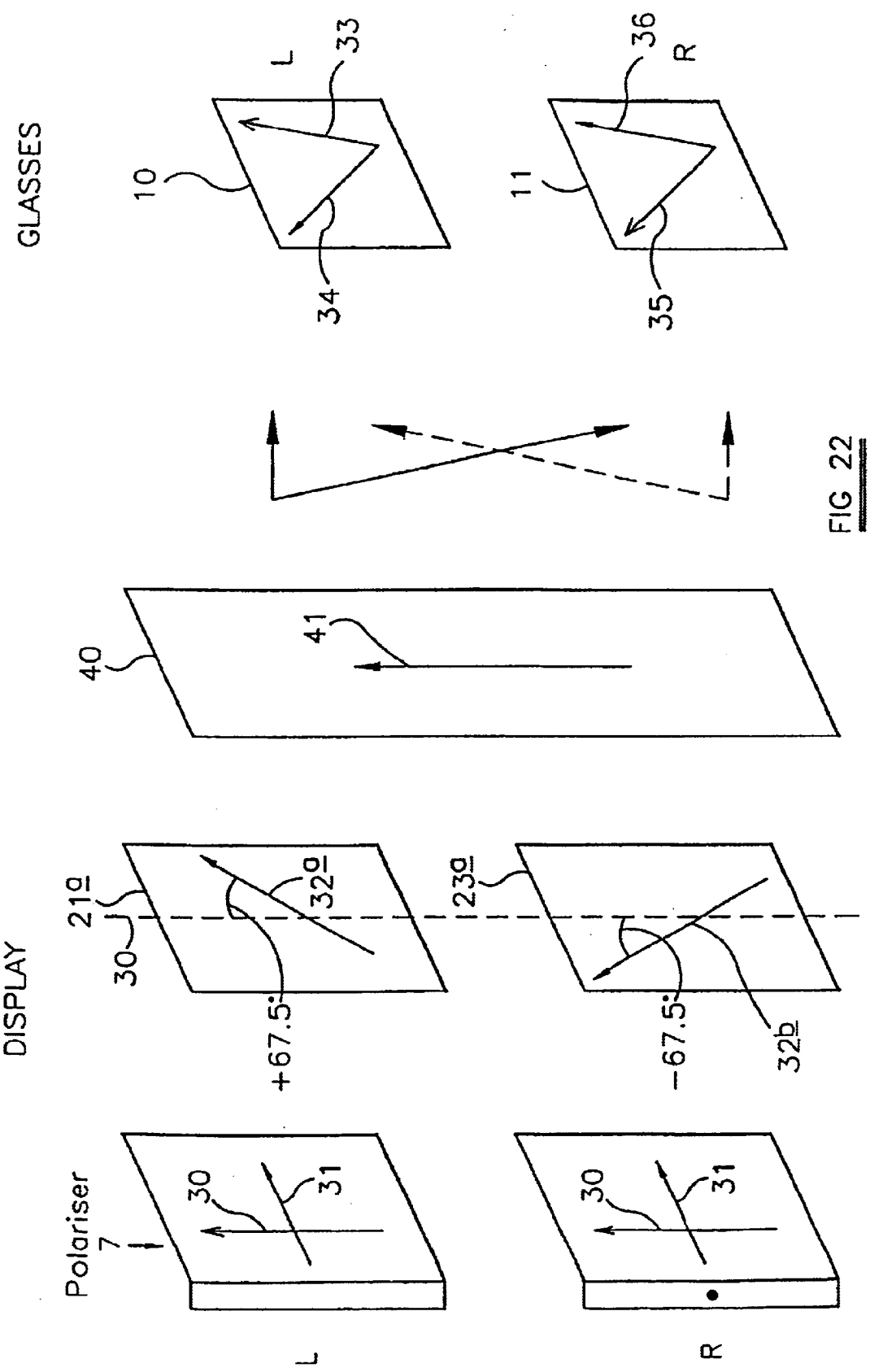
FIG. 22 is a diagrammatic view of part of a display constituting a sixteenth embodiment of the invention.

FIG. 22 illustrates an arrangement in which the performance of the optics for each eye is equivalent. The arrangement of FIG. 22 differs from that of FIG. 21 in that the optic axes 32a and 32b of the half wave plates 21a and 23a are oriented at +67.5° and −67.5°, respectively, the optic axis 41 of the half wave plate 40 is substantially parallel to the reference direction 30 and the polarising axes 34 and 36 of the polariser 10 and 11 are rotated by 45° in the negative (anti-clockwise) direction so an to be disposed at −45° and +45°, respectively, relative to the reference direction 30. In each case, transmitted light performance is determined by a two stage achromatic retarder configuration and in therefore good. However, extinction is limited by the retarder performance. Thus, the transmission performance is better than the extinction performance but the performances of the optics for the two eyes are equivalent.

Figure 23:
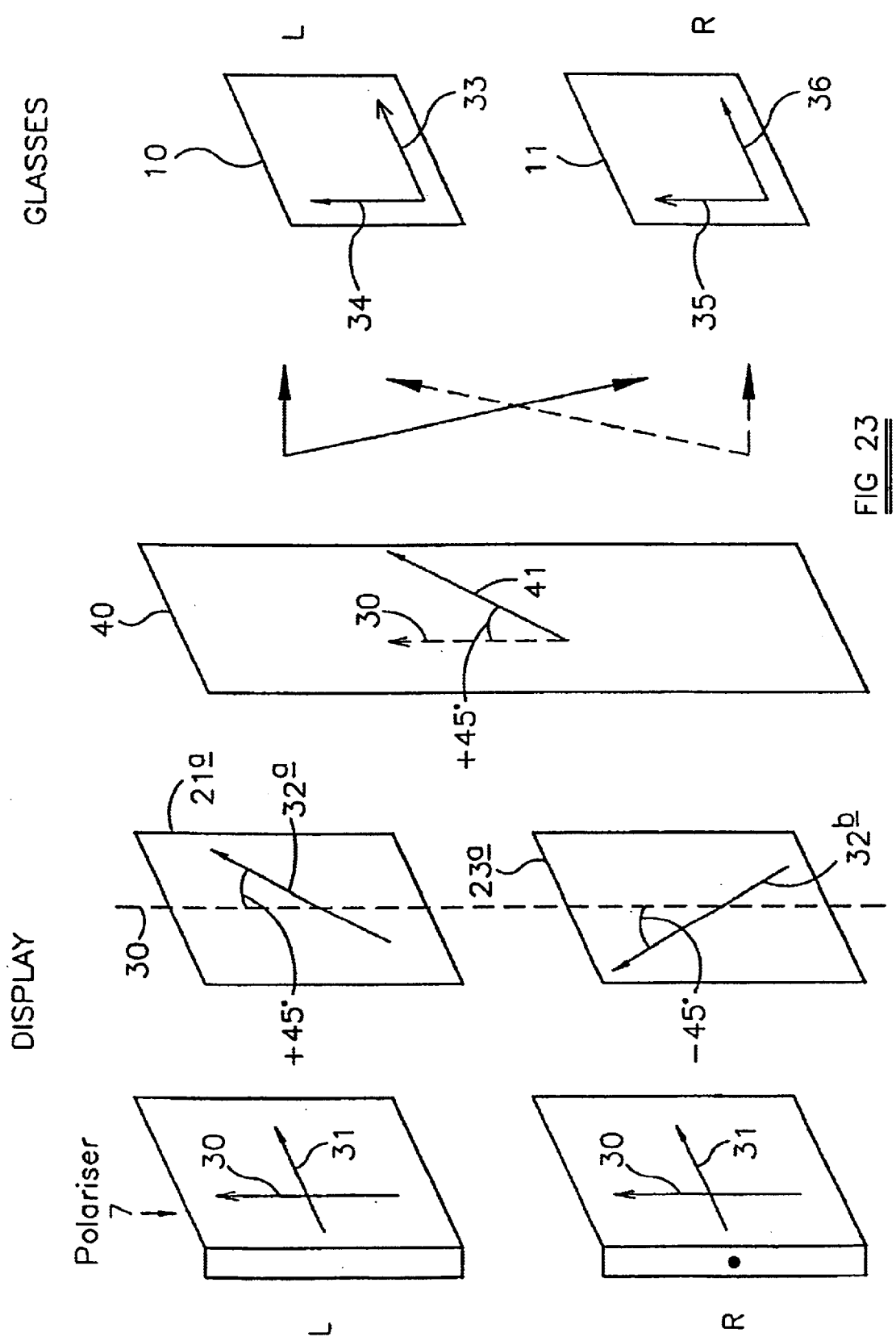
FIG. 23 is a diagrammatic view of part of a display constituting an seventeenth embodiment of the invention.

The arrangement shown in FIG. 23 uses the same polarisers 10 and 11 as shown, for example, in FIG. 20. The retarder array comprises two layers, each of which is a quarter wave retarder. The quarter wave retarder 21a for the left image pixels has an optic axis 32a oriented at +45° relative to the reference direction 30 whereas the quarter wave retarder 23a for the second stripes has an optic axis 32b oriented at −45° to the reference direction 30. Both stripes comprise a quarter wave retarder 40 whose optic axis 41 is oriented at +45° to the reference direction 30.

The left eye of the observer sees good extinction of the light from the right image pixels because this is equivalent to crossed retarders. However, the transmitted light from the left image pixels relies on the chromatic performance of two retarders. Conversely, the right eye sees limited extinction of the light from the left image pixels because this relies on the chromatic performance of two retarders. However, transmission of light from the right image pixels is good.

Figure 24:
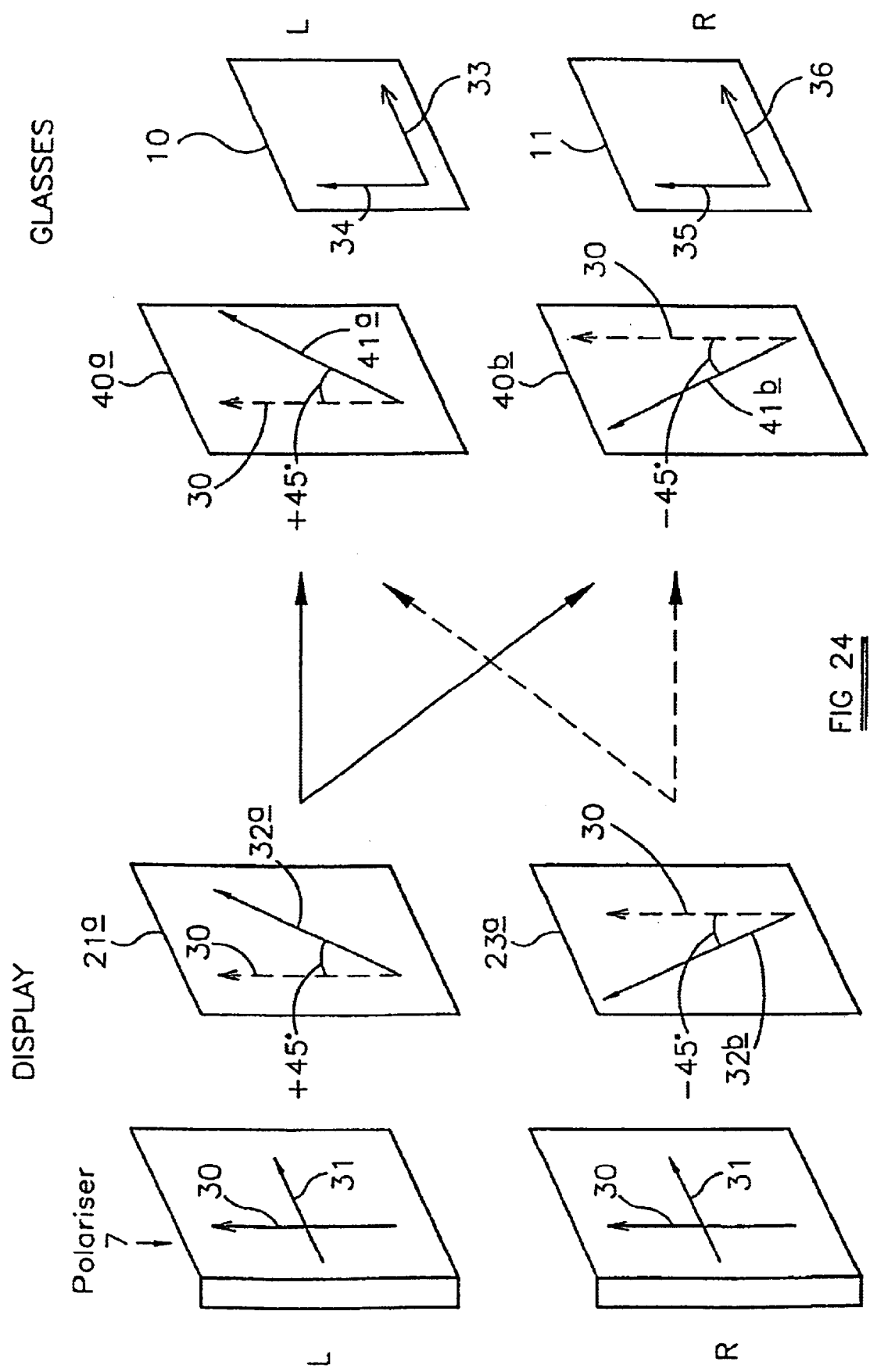
FIG. 24 is a diagrammatic view of part of a display constituting a eighteenth embodiment of the invention.

The arrangement shown in FIG. 24 differs from that shown in FIG. 23 in that the quarter wave plate 40 is omitted from the display but quarter wave plates 40a and 40b are provided in the viewing glasses. The optic axis 41a of the quarter wave plate 40a is oriented at +45° to the reference direction 30 whereas the optic axis 41b of the quarter wave plate 40b is oriented at −45° to the reference direction 30. The quarter wave plate 40a is provided for the left eye of the observer with the polarization direction of the polariser 10 being at 33. Similarly, the quarter wave plate 40b is provided for the right eye of the observer with the polarisation direction of the polariser 11 being at 36.

The performance of the optics for the right and left eyes is matched in this arrangement. In particular, each eye sees the extinction from crossed retarders but chromatic transmission from two retarders. However, light propagating from the display to the glasses is circularly polarised so that tilting of the head of the observer does not substantially affect the perceived 3D image.

Figure 25:
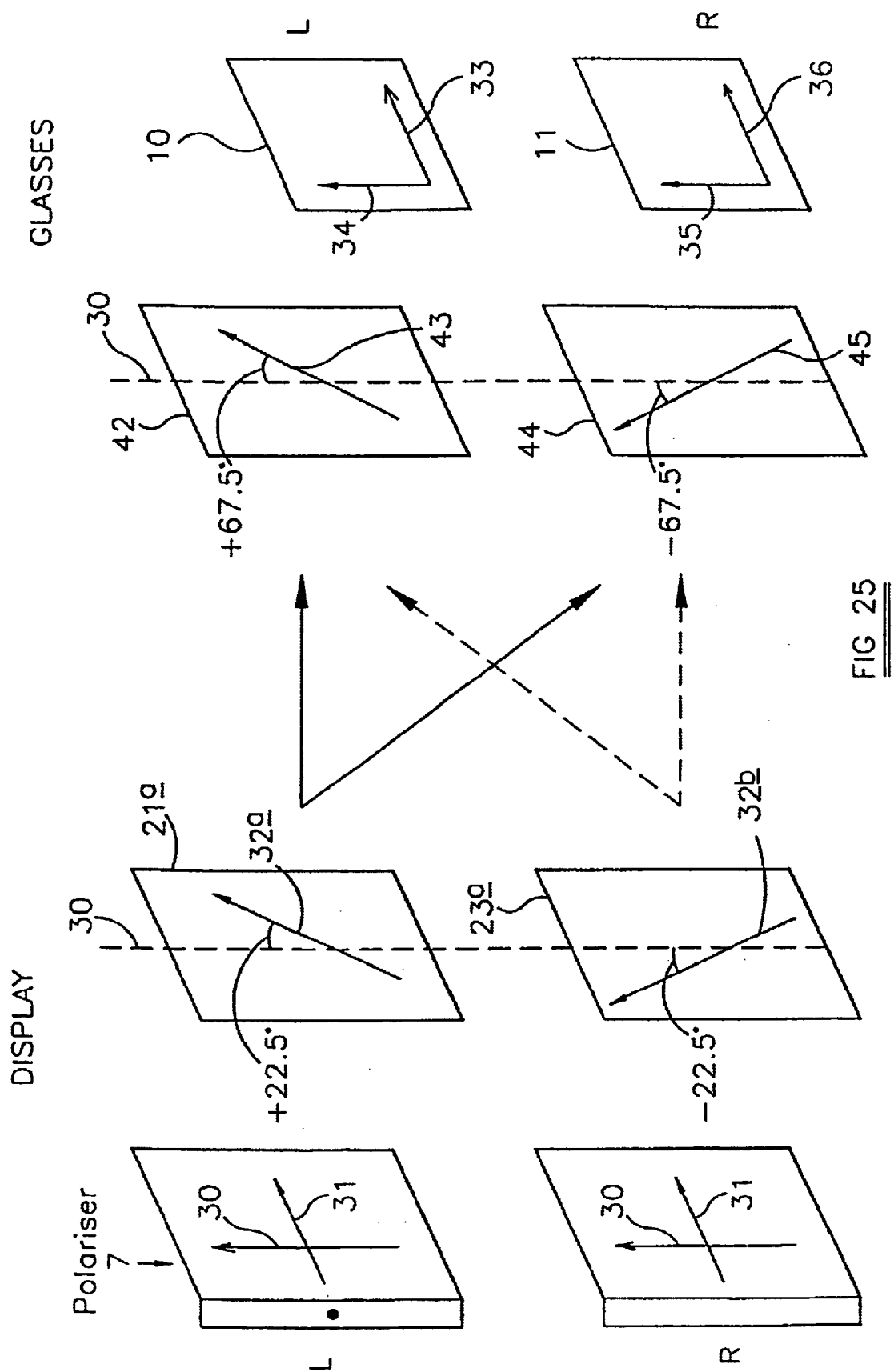
FIG. 25 is a diagrammatic view of part of a display constituting a nineteenth embodiment of the invention.

The arrangement shown in FIG. 25 differs from that shown in FIG. 21 in that the half wave retarder 40 is omitted but half wave retarders 42 and 44 are provided in the glasses for the left and right eyes, respectively, of the observer. The optic axis 43 of the half wave plate 42 is oriented at +67.5° relative to the reference direction 30 whereas the optic axis 45 of the retarder 44 is oriented at −67.5° to the reference direction 30. This configuration of retarders provides improved chromatic performance for transmission of light to each eye while retaining good achromatic extinction of light not intended for that eye.

Figure 26:
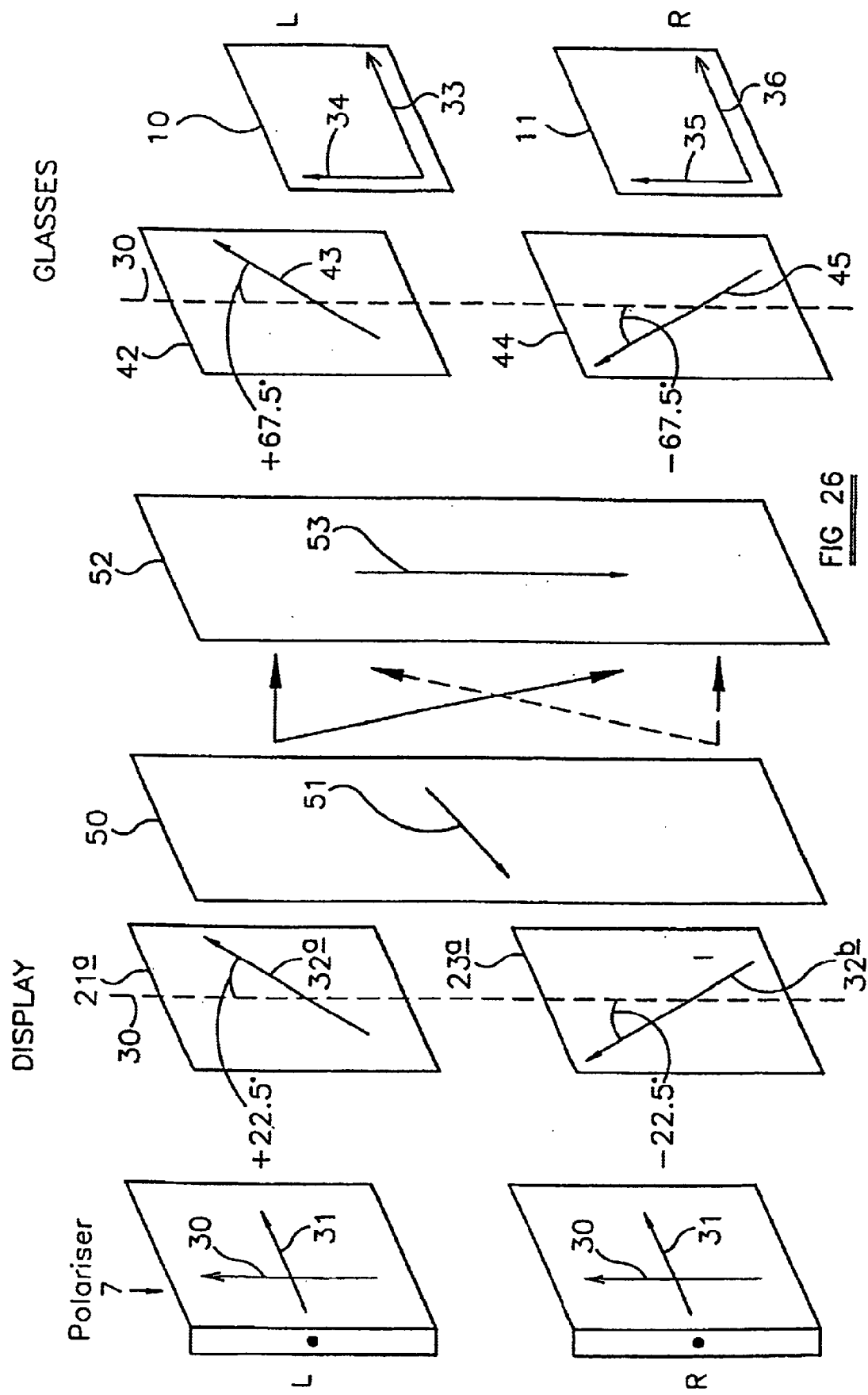
FIG. 26 is a diagrammatic view of part of a display constituting a twentieth embodiment of the inventions.

The arrangement shown in FIG. 26 differs from that shown in FIG. 25 in that the display comprises a quarter wave plate 50 whose optic axis 51 is substantially perpendicular to the reference direction 30 and the glasses comprise a quarter wave plate 52 whose optic axis 53 is substantially parallel to the reference direction 30. This arrangement therefore achieves the advantages or the arrangement of FIG. 25 with some possible degradation in the chromatic performance because of the presence of the quarter wave plates 50 and 52. However, this arrangement has the advantage of the arrangement shown in FIG. 24 in that light propagating from the display to the glasses in circularly polarized so as to allow tilting of the head of the observer without substantial degradation of the optical performance.

Any of the embodiments of the invention may be used in a stereoscopic display in which an indication of the correct i.e. orthoscopic viewing condition is provided by a further optical element, for example as disclosed in EP 0 660 728 and GB 2 321 815.

Figure 27:
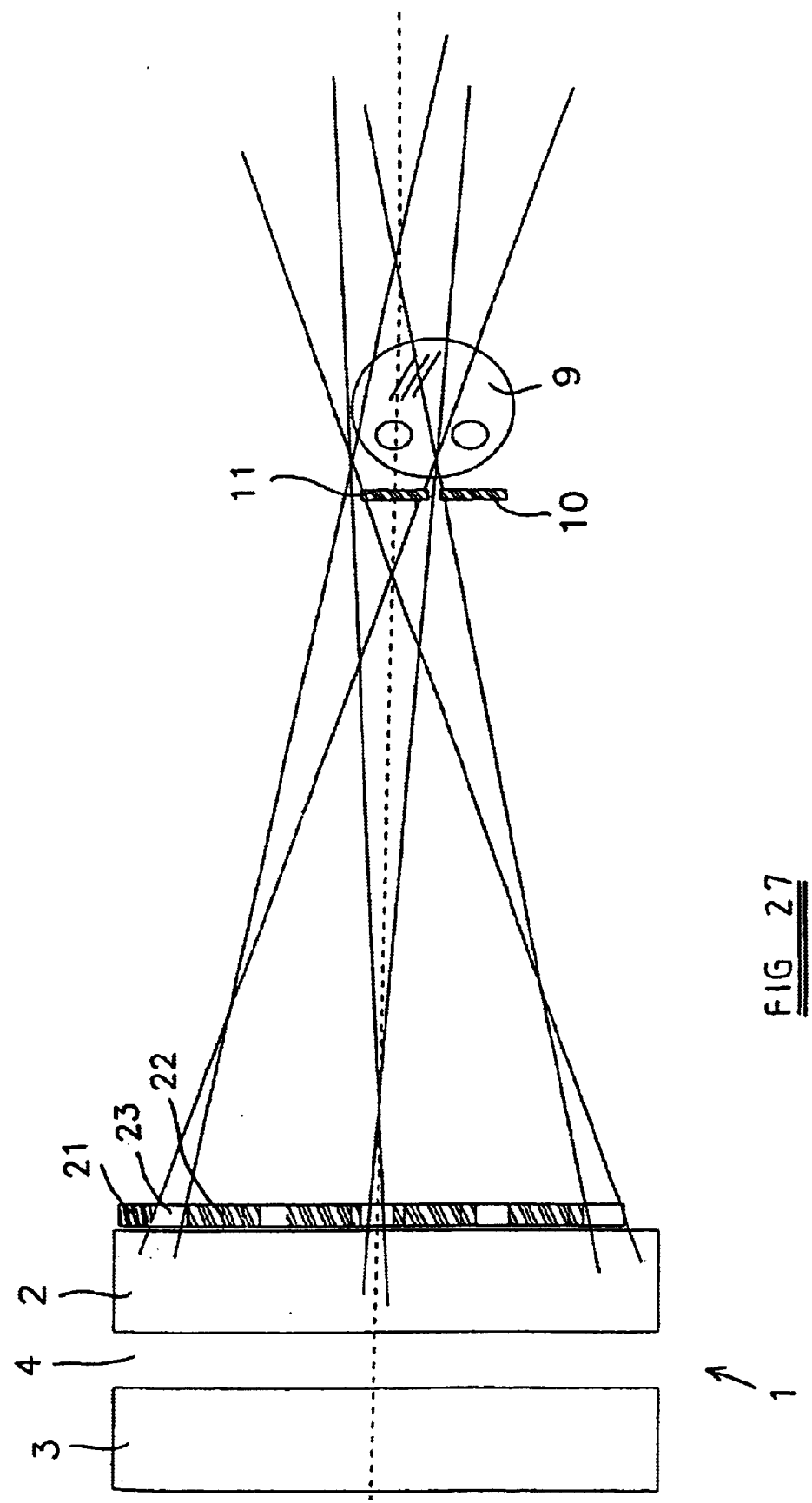
FIG. 27 is a diagrammatic horizontal cross sectional view of a display constituting a twenty first embodiment of the invention.

FIG. 27 shows another type of display which makes use of a reflective spatial light modulator 1 of liquid crystal type and a retarder array comprising stripes 21 to 23. The observer 9 wears glasses comprising substantially identical polarisers 10 and 11 with their polarising axes oriented parallel to each other.

The light reflected by the SLM 1 linearly polarised and the polarisation direction is unaffected by passage through the stripes 23. The polarisation of the reflected light is changed or rotated by 90° by the stripes 21 and 22. The polarisers 10 and 11 are orientated such that they pass light from only one or the sets or stripes. The combination of the retarders and the polarizers thus forms a parallax barrier and allows 3D viewing of the display. For 2D viewing, the observer 9 removes the polarising glasses so that the barrier structure is no longer visible. Thus, 2D images may be viewed at the full resolution and full brightness of the display.

Figure 28:
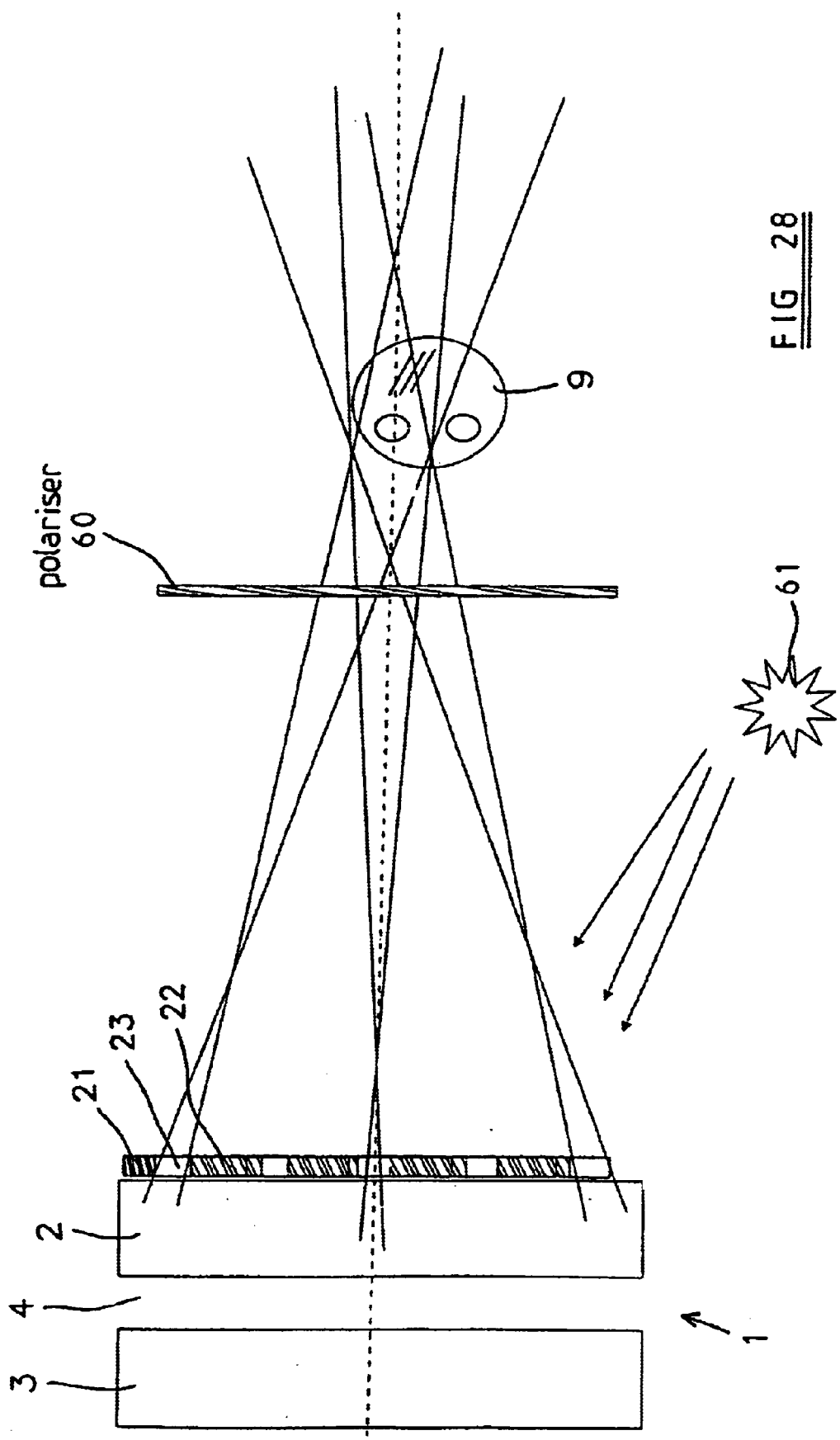
FIG. 28 is a diagrammatic horizontal cross sectional view of the display of FIG. 27 illustrating an alternative mode of use.

FIG. 28 illustrates an alternative mode of use of the display of FIG. 27. In this case, instead or wearing polarizing glasses, the observer 9 views the display through a sheet polariser 60 to allow the barrier structure to be visible for 3D viewing. The polariser 60 may be moved or removed so as to allow the observer 9 to see the display unimpeded for 2D viewing.

In both modes of operation, the display is illuminated by ambient light or light from a light source shown at 61 in FIG. 28. The light source may comprise light emitting diode, ambient light or a combination of light sources. Thus, the display is illuminated in both modes of operation by a substantial amount of light which has not passed through a polariser before being reflected by the display. An increased amount of light is thus available for reflection by the display, which can therefore provide a brighter image than reflective displays incorporating a "3D" polariser directly above the retarder array 21–23.

The retarder arrangement illustrated in FIGS. 27 and 28 may be replaced by polarisation modifying layers of the type disclosed in EP 0 829 744 and GB 2 317 295, the contents of both of which are incorporated herein by reference.

What is claimed is:

1. A stereoscopic display comprising a spatial light modulator having an array of picture elements and a retarder array having horizontally alternating first and second vertically extending stripes, the first strip being arranged to supply light from the modulator to an observer with a first polarisation and the second stripe being arranged to supply light from the modulator to the observer with a second polarisation different from the first polarisation, wherein each of the first and second stripes has a width which is greater than the horizontal pitch of the picture elements.

2. A display as claimed in claim 1, characterised in that the width of each of the first and second stripes is substantially equal to twice the horizontal pitch of the picture elements.

3. A display as claimed in claim 2, characterised in that the picture elements are arranged as groups of four in horizontally and vertically adjacent pairs and the picture elements of each group comprise red, green, green or white and blue picture elements.

4. A display as claimed in claim 1, characterised in that the width of each of the first and second stripes is substantially equal to three times the horizontal pitch of the picture elements.

5. A display as claimed in claim 4, characterised in that the picture elements are arranged as horizontally adjacent triplets of red, green and blue picture elements, each triplet being aligned with a respective first or second stripe.

6. A display as claimed in claim 5, characterised in that the green picture element is disposed between the red and blue picture elements of each triplet.

7. A display as claimed in claim 5, characterised in that each of the red and blue picture elements is narrower than the green picture element of each triplet.

8. A display as claimed in claim 6, characterised in that each of the red and blue picture elements is narrower than the green picture element of each triplet.

9. A display as claimed in claim 1, characterised by a lenticular screen, each of whose lenticules is cylindrically converging and extends vertically, the horizontal pitch of the lenticules being substantially equal to the horizontal pitch of the picture elements.

10. A display as claimed in claim 4, characterised by a lenticular screen, each of whose lenticules is cylindrically converging and extends vertically, the horizontal pitch of the lenticules being substantially equal to the horizontal pitch of the picture elements.

11. A display as claimed in claim 9, characterised in that the lenticular screen has a non-flat surface adjacent the modulator or the retarder array.

12. A display as claimed in claim 10, characterised in that the lenticular screen has a non-flat surface adjacent the modulator or the retarder array.

13. A display as claimed in claim 1, characterised in that the modulator is arranged to provide controllable attenuation of light.

14. A display as claimed in claim 13, characterised in that the modulator comprises a liquid crystal device.

15. A display as claimed in claim 1, characterised in that the modulator is of reflective type.

16. A display as claimed in claim 4, characterised in that the modulator is of reflective type.

17. A display as claimed in claim 1, characterised in that the second polarisation is substantially orthogonal to the first polarisation.

18. A display as claimed in claim 1, characterised in that the modulator is arranged to supply linearly polarised light to the retarder array with the light being polarised parallel or perpendicular to a reference direction.

19. A display as claimed in claim 18, characterised in that the first stripes are arranged to rotate polarisation by 90° and the second stripes are arranged not to change polarisation.

20. A display as claimed in claim 19, characterised in that the first stripes comprise half wave retarders.

21. A display as claimed in claim 20, characterised in that the half wave retarders have optic axes oriented at substantially 45° to the reference direction.

22. A display as claimed in claim 19, characterised in that the first stripes comprise first and second half wave retarders having optic axes oriented at substantially 22.5° and substantially 67.5°, respectively, to the reference direction.

23. A display as claimed in claim 18, characterised in that the first and second stripes comprise half wave retarders whose optic axes are oriented at substantially +22.5° and substantially −22.5°, respectively, to the reference direction.

24. A display as claimed in claim 23, characterised in that the first and second stripes comprise a further half wave retarder whose optic axis is oriented at substantially 67.5° to the reference direction.

25. A display as claimed in claim 18, characterised in that the first and second stripes comprise half wave retarders whose optic axes are oriented at substantially +67.5° and substantially −67.5°, respectively, to the reference direction and a further half wave retarder whose optic axis is substantially parallel to the reference direction.

26. A display as claimed in claim 18, characterised in that the first and second stripes comprise quarter wave retarders whose optic axes are oriented at substantially +45° and substantially −45°, respectively, to the reference direction and a further quarter wave retarder whose optic axis is oriented at substantially +45° to the reference direction.

27. A display as claimed in claim 19, characterised by viewing spectacles having first and second linear polarisers with mutually orthogonal polarising directions.

28. A display as claimed in claim 23, characterised by viewing spectacles having first and second linear polarisers with mutually orthogonal polarising directions.

29. A display as claimed in claim 25, characterised by viewing spectacles having first and second linear polarisers with mutually orthogonal polarising directions.

30. A display as claimed in claim 26, characterised by viewing spectacles having first and second linear polarisers with mutually orthogonal polarising directions.

31. A display as claimed in claim 18, characterised in that the first and second stripes comprise quarter wave retarders whose optic axes are oriented at substantially +45° and substantially −45°, respectively, to the reference direction.

32. A display as claimed in claim 31, characterised by viewing spectacles having first and second quarter wave retarders whose optic axes are oriented, in use, at substantially +45° and −45°, respectively, to the reference direction and first and second linear polarisers with substantially parallel polarising directions.

33. A display as claimed in claim 23, characterised by viewing spectacles having first and second half wave retarders whose optic axes are oriented, in use, at substantially +67.5° and substantially −67.5°, respectively, to the reference direction and first and second linear polarisers with substantially parallel polarising directions.

34. A display as claimed in claim 23, characterised in that the first and second stripes comprise a quarter wave retarder whose optic axis is oriented at substantially 90° to the reference direction.

35. A display as claimed in claim 33, characterized in that the first and second stripes comprise a quarter wave retarder whose optic axis is oriented at substantially 90° to the reference direction.

36. A display as claimed in claim 35, characterised in that the spectacles comprise a quarter wave retarder whose optic axis is oriented, in use, substantially parallel to the reference direction.

* * * * *